United States Patent [19]
Leenstra, Sr. et al.

[11] Patent Number: 5,303,367
[45] Date of Patent: Apr. 12, 1994

[54] COMPUTER DRIVEN SYSTEMS AND METHODS FOR MANAGING DATA WHICH USE TWO GENERIC DATA ELEMENTS AND A SINGLE ORDERED FILE

[75] Inventors: Richard B. Leenstra, Sr., Bremerton; Edwin H. Wurden, Poulsbo, both of Wash.

[73] Assignee: Applied Technical Systems, Inc., Port Orchard, Wash.

[21] Appl. No.: 621,834

[22] Filed: Dec. 4, 1990

[51] Int. Cl.$^5$ .................................. G06F 15/40
[52] U.S. Cl. ..................... 395/600; 364/DIG. 1; 364/222.81; 364/282.1; 364/283.1; 364/283.2
[58] Field of Search .......................... 395/600, 425

[56] References Cited

PUBLICATIONS

European Patent Application, Publication Number 0270360, Jun. 8, 1988, Tektronix, Inc.
PCT International Application, International Publication Number WO89/09972, Oct. 19, 1989, Digital Equipment Corporation.
Tremblay, Jean-Paul, et al., "An Introduction to Data Structures with Applications," 2nd Ed., McGraw-Hill, Inc., 1984, pp. 811–825.

*Primary Examiner*—Paul V. Kulik
*Attorney, Agent, or Firm*—Hughes & Multer

[57] ABSTRACT

Computer-based systems and methods for managing data. These systems and methods take advantage of a unique model which: increases speed and flexibility; eliminates the need for a complex data manipulation language, data or application dependent software, and separate structuring tools such as pointers, lists, and indexes; and automatically creates among the data relationships which may or may not have been apparent to a user or the designer. Salient, unique features of the systems and methods are their capabilities for providing: a generic data structure consisting of two generic data elements and a generic data set array, indentured data set relationships, inversion of data set relationships, dynamic reorganization of data sets, control over the data relationships that can be established, global linking of data sets, and automatic connection projection. A database structure which is independent of the type of data being managed is established, and the data is entered into a single file in which the data is automatically logically and physically ordered.

87 Claims, 11 Drawing Sheets

DATA SET STRUCTURE

NOTE: DELIMITER CAN BE ANY BINARY NUMBER
USUALLY THE BINARY REPRESENTATION OF,
SYMBOL SUCH AS "/" OR "*"

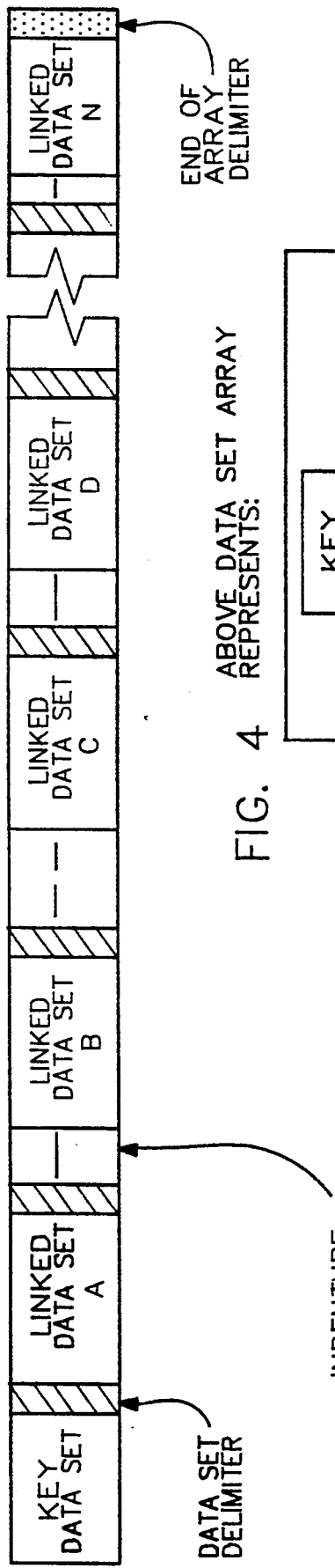
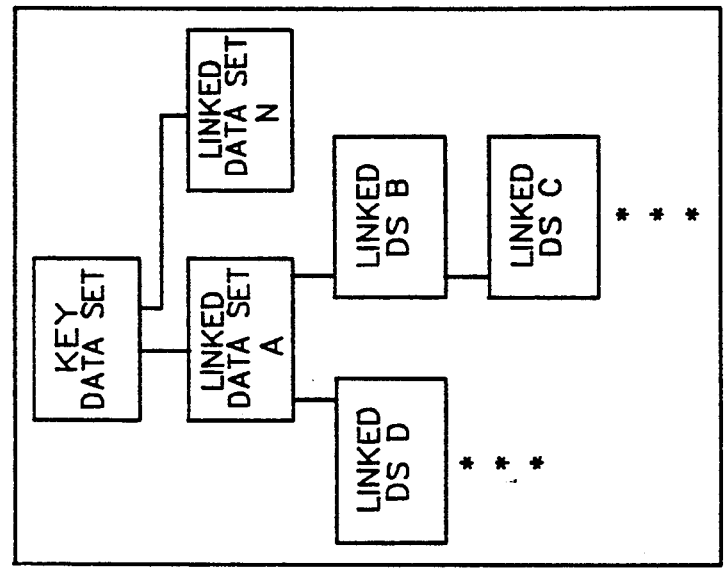

DATA CONTROL MODULE

| DATA TYPE | DESCRIPTION | KEY DATA TYPE | LINKS TO DATA SET | WITHIN KEY DATA SET | INVERT LINK | GLOBAL LINK |
|---|---|---|---|---|---|---|
| COST | UNIT PRICE OF PART | N | MFR→PN | MFR | N | N |
| | | | NSN | NSN | N | Y |
| | | | SUP→PN | MFR | N | N |
| LOCATION | LOCATION | Y | MFR | MFR | Y | N |
| | | | SUP | SUP | Y | N |
| MFR | MANUFACTURER | Y | LOCATION | LOCATION | Y | N |
| | | | MFR→PN | MFR→PN | Y | N |
| | | | PHONE | PHONE | Y | N |
| MFR→PN | MANUFACTURER'S PART NUMBER | Y | MFR | MFR | Y | N |
| NSN | NATIONAL STOCK NUMBER | Y | MFR→PN | MFR | Y | N |
| PHONE | TELEPHONE NUMBER | Y | MFR | MFR | Y | N |
| SUP | SUPPLIER | Y | SUP | SUP | Y | N |
| | | | LOCATION | LOCATION | Y | N |
| | | | MFR→PN | MFR | Y | N |
| | | | PHONE | PHONE | Y | N |
| SUP→PN | SUPPLIER'S PART NUMBER | Y | SUP | MFR | Y | N |

FIG. 6

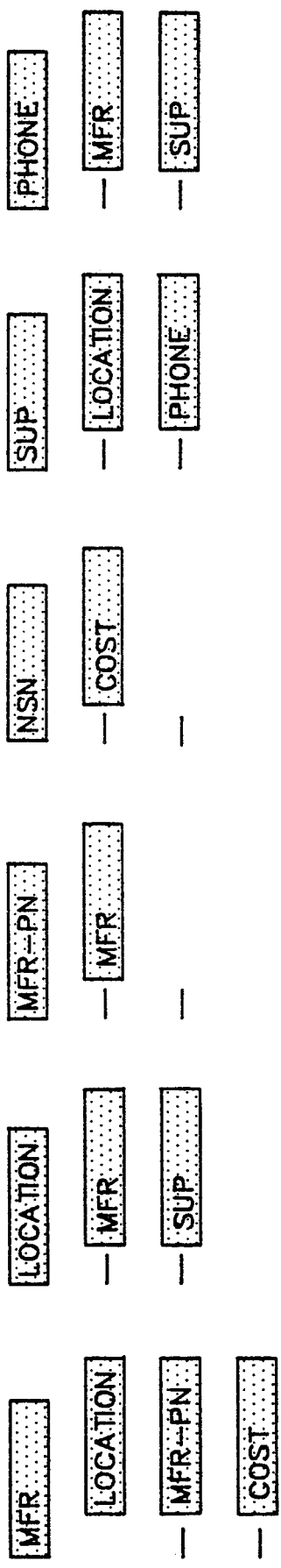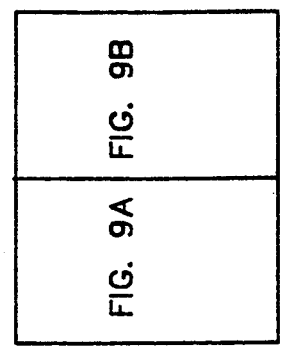

NOTE: SELECTED DATA SET (Y) FROM THE KEY DATA SET (X) ARRAY COULD BE THE KEY DATA SET (X) ITSELF.

NOTES:
1. SELECTED DATA SET (A) FROM THE KEY DATA SET (X) ARRAY COULD BE THE KEY DATA SET (X) ITSELF.
2. DS=DATA SET
   HL=HIGHER LEVEL
   LL=LOWER LEVEL
   CP=CONNECTION PROJECTION

FIG. 10
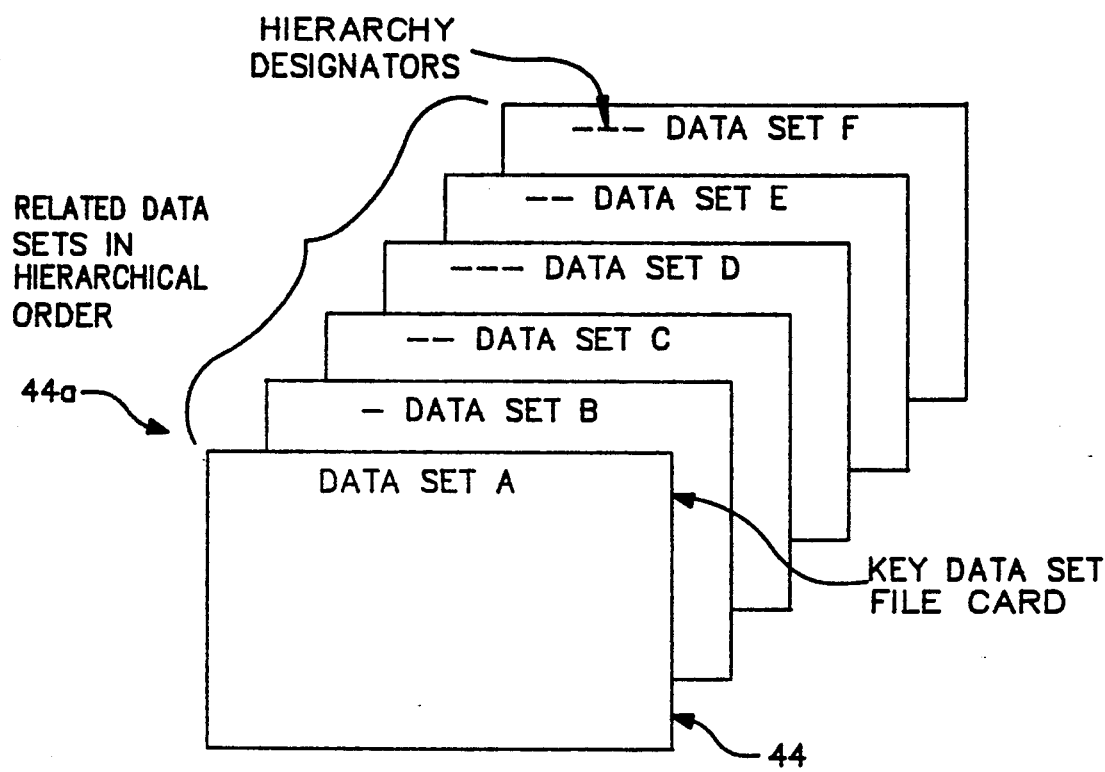
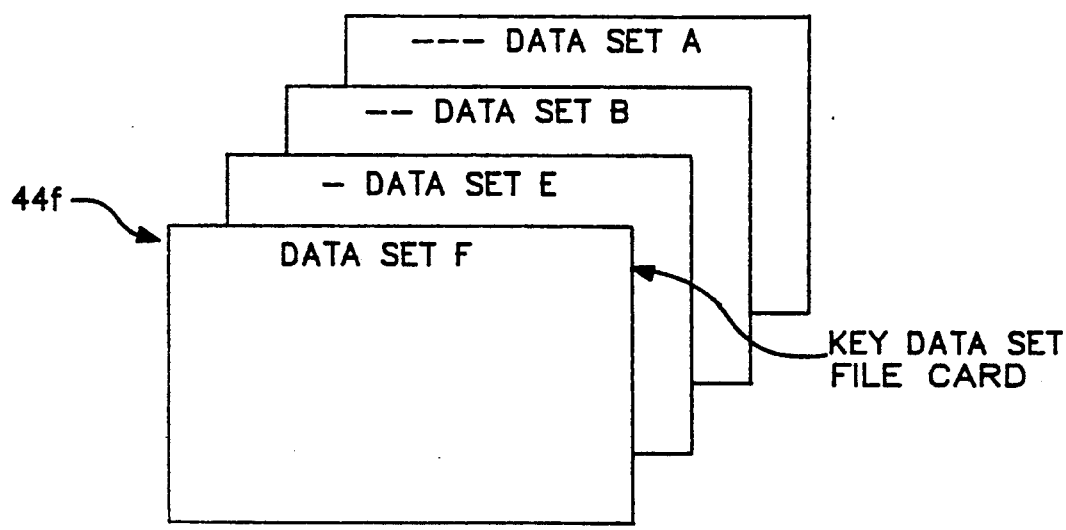

COMPUTER DRIVEN SYSTEMS AND METHODS FOR MANAGING DATA WHICH USE TWO GENERIC DATA ELEMENTS AND A SINGLE ORDERED FILE

TECHNICAL FIELD OF THE INVENTION

The present invention relates in large part to computer-based systems for managing data and to the use of computers in novel, improved methods for structuring, storing, accessing, modifying, and processing data.

In another aspect, however, the present invention also relates to other physical systems and methods for accomplishing the same objectives and use the same basic techniques as the computer driven methods and systems.

For the sake of clarity and brevity, the principles of the present invention will be developed primarily with reference to computer driven applications of the invention. It is to be understood, however, that this is not intended to limit the scope of the invention as defined in the appended claims.

BACKGROUND OF THE INVENTION

Computers are widely used: to store and find data, to move data from storage to a data manipulation area, to carry out the modification and processing of data necessary to transform such data into useful information, to output selected data to an output device, and to move new or modified data to data storage devices.

The definition of the process and apparatus employed for the data management tasks just enumerated is commonly called a database model. A database is a repository for data with a defined organizational scheme, subject to defined processes to manipulate the data and defined constraints to assure data integrity. Therefore, the database model describes the logical or physical structure and the method for processing the data.

CONVENTIONAL FIELD REPRESENTATIONS

Since the invention of the punched card by Herman Hollerith in the 1890s, data used in information systems has been structured according to a standard scheme: characters (letters, numbers, or special symbols) represented by a series of binary numbers. Originally, these numbers were represented by holes in punched cards; as electronic data processing emerged, however, the punched holes were replaced by electrical and magnetic representations of binary data. Groups of binary data are combined into fields that represent a value associated with some entity. Fields are incorporated into records which are organized into a database structure with defined record relationships.

The definition of the data in current data processing systems or databases is commonly processed separately from the definition of the entity. For example, a Social Security Number field may contain the binary equivalent of 534-36-8391. External to this field would be its definition as a Social Security Number, but that would not necessarily be evident from the data itself (e.g. 534-36-8391 could also represent an international telephone number or some type of document number). Since the associated data definitions are not represented as processable data contained within the data field, separate data-dependent field definition dictionaries or indexes or similar methods are required to define and manage these data elements as unique entities.

CONVENTIONAL RECORD STORAGE REPRESENTATIONS

Conventional data processing systems group a fixed number of data fields into data records. Thus, all of the fields pertaining to an employee may be grouped into an EMPLOYEE record. There are three fundamental physical record organizations originally based on physical file storage methods; sequential, indexed-sequential and random file. Record grouping methods such as these are use to locate individual records on physical storage devices (such as random access memory) for movement of these records to and from a data manipulation area.

In additional types of file organizations, developed since sequential, indexed sequential and random file organizations, the concept of a file as a physically contiguous group of records disappears entirely.

Nevertheless, heretofore proposed and currently available data management systems use record formats which require definition of the field type and/or number of fields in the record. And with the exception of sequential file organization, all of these applications use separate indexes as pointers to records or in some limited cases such as the product HYPERTEXT, to text fields within records.

CONVENTIONAL DATABASE ORGANIZATION IN MEMORY

The next higher level of abstraction of data organization is the arrangement of data records and record keys in the database while the data is being manipulated in the data manipulation area—typically, random access memory or its equivalent. Computer memory is conventionally comprised of a linear string of memory storage units with a set of sequential locations which are indexed by sequential numbers usually called addresses. Consequently, records and record keys are similarly arranged as sequential lists, linked lists or inverted lists.

LOGICAL DATABASE RECORD RELATIONSHIP

With the advent of database processing in the late 1960's, those database structures discussed above were expanded to group all files together (logically if not physically) in a single database; and relationships among the records in the files were represented in the database structure as trees, simple networks, complex networks, or relational tables. Furthermore, data definitions, which hereto had been stored in application specific programs, were moved inside the database management system (DBMS) software. Thus, the DBMS contained not only source data but, also, data relationships and data that described the contents and structure of the database, the latter typically being located in a separate data dictionary. Database records, however, continued to contain data values in defined data fields, using a conventional record format with separate indexes and separate relationships definitions.

CONVENTIONAL DATABASE MODELS

There are many database models which use the above structures. The important ones include the Hierarchical Model (tree model), the Network Model, the CODASYL DBTG Model, the Entity-Relationship Model and the Relational Model. Also of interest because it is similar in certain respects to the database model of the present invention, although not a mainstream database model, is the Entity-Set model. These models are discussed in detail in: Kroenke, Database Processing, 1983, pp 193-198; M. Stonebraker, Readings in Database Systems, 1988, pp 369-422 and pp 445-456; and Special Issue on Data-Base Management Systems. ACM Comput. Surv. 8, 1 (March 1976).

The Hierarchical Data Model

A model is hierarchical if its only data structure is a hierarchy (tree) with a root node, or data item, at the top and subordinate data or records (called segments in this model). To represent the relationship between EMPLOYEE and DEPARTMENT data, for example, a DEPARTMENT segment would be defined as containing the segments of all employees who work in that department. An example of this type of data base is IMS, licenced by IBM.

The hierarchical database model fits data into predefined relationships among database records in the form of trees.

The Network Data Model

A model is a network if its data structures are both trees and simple networks. Complex networks need to be decomposed before they are represented.

Relationships are explicitly defined according to connecting data constructs called sets. Thus, to represent the relationship between employees and departments, a Department-Employee set is defined: and all of the records of employees in a given department are connected to a set that is owned by the DEPARTMENT record for that department. The most prominent example of the network data model is CODASYL DBTG.

The CODASYL DBTG (Conference on Data System Languages, Database Task Group) data model was developed during the late 1960s and is the oldest of the data models. The DBTG model is a physical database model. It incorporates all network and hierarchical models. There are constructs for defining physical characteristics of data, for describing where data should be located, for instructing the DBMS regarding the data structures to be used for implementing record relationships and other similar physical characteristics. Unlike the relational model, relationships become fixed when they are defined. The DBTG model provides a structure (the DBTG set) for expressing one-to-many relationships. Many DBMS products are based on the CODASYL DBTG model.

The hierarchical and network database models both structure data into predefined relationships among database records. The inherent rigidity of this type of database structure limits the ability of these systems to respond to new data requirements or changes to existing data relationships. Changes almost always require redefinition and reorganization of the database and its associated indices as well as reprogramming of data-dependent application software, all of which are time-consuming and expensive functions. Another disadvantage of these systems is the limited ad-hoc query capability. Because database relationships are predefined, only predefined and established relationships can be queried rapidly.

The primary advantage of hierarchical and network models is speed. Since the data relationships are predefined and established, in a consistent computer environment the time it takes to respond to a fixed database query is significantly less than a query of comparable complexity using a relational database structure, particularly for larger, more complex databases.

The Entity-Set Model

This model is based on set theory and provides methods for operating on quantities called entities and entity sets. Entities are described by a doublet consisting of a set-type/entity-value pair, such as NAME/Peter Jones. The Entity-set model forms the basis for the Data Independent Accessing Model (DIAM). The DIAM extends the entity name doublet to a triplet consisting of set-type/role/entity-values such as AGE/NO-OF-YEARS/25. The DIAM also describes access paths to data as ordered strings of data objects of three different "Contiguous Data Groups" which replace records: "A" strings of entity sets common to a specific entity (field values), "E" strings of entity sets with common set names (type descriptions) and "L" strings which define links between entity sets. Data objects and strings are mapped into contiguous linear address space in memory and to formatted physical subdivisions of real recording media in terms of a Basic Encoding Unit. The Basic Encoding Unit includes a "Role name" key, an association pointer (field name), a value pointer, and a description.

The weaknesses of this model include the need for: three different record types to define the database, separate pointers to data elements, and separate indexes of role name for string subsets.

The Entity-Relationship Model (E-R Model)

This model is primarily a logical database model, although it has some aspects of a physical model as well. Entities are representations of objects in the real world; examples are records of customers, invoices, salespeople, and so forth. Entities of similar structure are collected into entity sets. For example, all CUSTOMER records form the customer entity set; all SALESPERSON records form the salesperson entity set. A database contains data about entities and about relationships among entities. Relationships have data of their own. The E-R model can be used for logical database design. Also, entity-relationship diagrams can be used to express a physical design for relational implementations. This model is usually combined with structures for other models such as the relational model described below.

The Relational Model

The relational model does not use the terms file, record, and field. Instead, data is structured as tables (also called relations). These tables are simply flat files. A separate table is required for each record structure. The rows of the table are the file records (rows are sometimes called tuples of the relation). The fields of the table are in the columns; they are sometimes called the attributes of the relation.

Relationships among records are represented by duplicating identifying data (called key data). Using the terms of the relational model then, rows in a EMPLOYEE table are related to rows in a separate DEPARTMENT table by storing the key of DEPARTMENT (say department number) in the rows of the EMPLOYEE table.

Systems based on the relational model do not predefine relationships among the records contained in tables (files). Instead, relationships are derived from the database during query. Since relationships among records are not preestablished, new data tables can be developed and existing tables modified without redefining existing data relationships and without the programming that depends on these relationships. As such, relational database systems are easier to change when new data requirements are identified.

Prominent examples of DBMS products that adhere to the relational data model are DB2 and SQL/DS, licensed by the IBM Corporation; ORACLE, licensed by the ORACLE Corporation; and SQL/Server, licensed by the Microsoft Corporation. SQL, or Structured Query Language, has been adopted by the American National Standards Institute as the fundamental way for processing relational database data.

The increased flexibility provided by relational systems has a significant cost in terms of system response time since relationships among records contained within various tables (files) must be derived each and every time a query is made. Another problem with relational database systems is that they only yield the relationship the user explicitly requests. The database may contain important information or relationships that are unknown to the user, but, unless the user anticipates the existence of such data and specifically requests the information, this information will not be visible. Tree-structured and network relations and recursive retrievals are difficult in a relational database system. In fact a formal proof has shown it cannot be done in a single statement since a tree is not a standard "first normal" form. The complexity of specifying correct questions about the database, commonly called queries, results in the need for a complex, often costly additional query language for efficient use of relational databases.

DBMS-Specific Models

There are over one hundred different commercial DBMS products. The DBMS are sometimes categorized in terms of their underlying data model. A DBMS is considered a relational system if it conforms, in essence, to the relational data model. Alternatively, a DBMS is considered to be a CODASYL system if it conforms, in essence to the CODASYL DBTG data model. If a DBMS does not conform to one of the above data models, it has its own, unique data model. There are many systems that fall into this category. DATACOM/DB and ADABAS are inverted list data models. SYSTEM 2000, TOTAL, and IMAGE are successful DBMS that have their own data models. A recent database concept called object oriented data base organization is a combination of, or supplement to, the above models. Object oriented database organization allows manipulation of object actions as well as data.

Major Shortcomings of Prior Art Database Management Systems

The prior art database models do not adequately support the modelling of complex networks having many-to-many relationships because of one or more of the following:

Conventional models structure data as separate fields, records, indexes and files with data definitions and data relationships separate from data values. This necessitates definition of all data types and/or data structures during system design or at the time of query. The relationships that can be created from these predefined data types and structures are thus limited to those that the system designers/users can anticipate. Since it is virtually impossible to anticipate and predefine all possible data types and structures, accurate and complete and modeling of complex real-world relationships is precluded.

Conventional models do not automatically provide access to all possible relationships involving a selected data field.

Conventional models provide a limited number of record or data elements keys: many-to-many relationships require separate special indexes or many added record pointers. As the number of indexed relationships grows, indexes can grow to be larger than the data base itself. Hence, only a limited number of relationships between key records can be accommodated in practice.

Conventional models require costly, complex data-dependent programming to maintain and display the data definitions, data values, and data relationships because they are not fully data-definition and relationship-definition independent.

Present database models with flexible relationship structures, such as the Relational Model, require costly, complex query languages to access data and provide output. Other models with a predetermined relationship structure have limited ad-hoc query capability.

None of these databases can automatically create relationships between data elements that in fact exist but are not explicitly defined.

SUMMARY OF THE INVENTION

We have now invented, and disclosed herein, certain new and novel computer based systems and methods for managing data that are free of the above-enumerated and other drawbacks of those database management systems and methods employing heretofore proposed database models.

The novel systems and methods disclosed herein make use of a new database model termed the Contiguous Connection Model (CCM). As a consequence, large sets of source data can be managed by the herein disclosed and claimed methods using only two generic data elements and a single ordered file.

By using the CCM, one can readily provide data management systems and methods which are not found in those systems and methods utilizing conventional models. CCM employs a data definition and structuring technique that is totally different from the record structure common to the above described data-base models. This eliminates the need for data-dependent programming because the data definitions, data values, and data relationships are directly incorporated into a single generic database structure. The result is a self-describing database that is absolutely independent of the type of data being handled and therefore requires no application specific or data dependent software to define, maintain, or display data relationships for a given enterprise. Systems employing the CCM system also automatically create and display complete and correct connections among all input data. These connections go beyond user-defined data relationships in that connections are automatically established between real but seemingly unrelated data relationships that would otherwise be invisible to the user.

Thus, the novel systems and methods of the present invention make it possible to index large sets of user-defined data via a unique data-independent input, indenturing, inversion, and automatic connection process. This is further made possible through the use of only two essential data structures, a Data Set (consisting of two generic data elements, data type and data value) and a Data Set Array (consisting of related data sets. Together these structures provide the capability to manage virtually unlimited numbers of data types and data relationships.

System and process features that distinguish our database management systems and methods from those heretofore used and proposed include:
- Generic Data Structures Consisting of Generic Data Type and Data Value, and a Generic Data Set Array
- Indentured Data Set Relationships
- Inversion of Data Set Relationships within an array
- Dynamic Reorganization of Data Sets
- Data Control Module
- Global Linking of Data Sets
- Automatic Connection Projection

GENERIC DATA STRUCTURE

The CCM is unique in that it replaces data fields and separate field name files with one basic unit called a Data Set which consists of two integral (inseparable), generic, variable length, data elements —Data Type and Data Value—. Together, these define the specific data type and provide a specific data value. The Data Set performs functions beyond that of conventional fields, however, in that it provides functionality similar to conventional records. Data Sets are mapped into linear address space in memory and to formatted physical subdivisions of real recording media in terms f this basic unit. The generic nature of the Data Set frees CCM from the restrictive, rigidly defined "data elements", "fields" and "records" of conventional DBMS methodologies. The user is able to introduce new types of data into the system as the need arises without having to reprogram database definitions, report generators, or screen displays.

The Data Set Array replaces the records and record indexes of conventional databases. The Data Set Array consists of an integral (not external) indexing key, called a Key Data Set, followed sequentially by indentured Data Sets which consist of all related descendent Data Sets in the hierarchy (called Linked Data Sets). These linked Data Sets are input and maintained in correct hierarchical-sequential order relative to the key Data Set at all times and thereby act as a source of related descendent Data Set information.

INDENTURED DATA SET RELATIONSHIPS

Today, all computer manipulated standard databases structure relations between records and relations between fields within records are established by separate means such as pointers, separate lists or separate indexes. Systems and methods employing the CCM depart substantially from this way of relating data. In CCM utilizing systems and methods, relationships are directly defined between Data Sets within a Data Set Array, not between conventional records.

This has the advantage that no record construct for data relationships is required. Instead, all complex networks of related Data Sets are decomposed into a multiplicity of hierarchical relationship trees, each with a single key data set, by methods commonly known to those familiar with the art. In turn, each of these hierarchies is embodied in a Data Set Array consisting of a single Key Data Set used to access the database and hold the "top" or "root" position in the hierarchy of the array and any number of subordinate, linked Data Sets making up a hierarchy. All Linked Data Sets describe the Key Data Set in a given array.

Linked Data Sets in the resulting Data Set Array are indentured to the Key Data Set, without duplication, in true hierarchical order by physically and logically ordering the linked Data Sets within an Array using indenture hierarchy designators at the start of each linked Data Set. Therefore, no additional data elements, indexes or pointers are required in CCM-based systems and methods to allow for an endless set of source data relationships via indenture. This provides complete flexibility in defining discrete data relationships regardless of the application.

Whenever a Data Set is linked to another Data Set within a Data Set Array, CCM inverts the input relationship, creating a new (or updated) Data Set Array with the input linked Data Set as the Key Data Set and all direct predecessors (parent, grandparent, etc.) in the original Data Set Array linked to the input Data Set in inverted order. This process of inverting the input relationship hierarchy, called Inversion, automatically generates or updates an existing Data Set Array for each input Data Set. Thus the Inversion process integrates under a common Key Data Set all Data Sets from all Arrays that contain the common Linked Data Set. In other words, every unique Linked Data Set will exist as a Key Data Set in a Data Set Array. This enables access via any Data Set to all explicit relationships in the database directly and without derivation of the relationships. Therefore, through Inversion, the Data Set Array replaces the separate indexes needed by prior art database management systems and methods.

Inverted Data Set Arrays have the same organization as Data Set Arrays. They consist of a Key Data Set and linked Data Sets. Linked Data Sets consist of all directly related precedent Data Sets in the original Key Data Set hierarchy. These linked Data Sets are maintained in inverted hierarchical sorted order relative to the Key Data Set at all times and thereby act as a source of information for locating related precedent Data Sets.

The Inversion process automatically creates contiguous connections among all Data Set Arrays having a common Data Set link. This provides a very fast, direct access to every Data Set. Within a given array, there is a direct,. physical link between Data Sets; and these relationships are immediately displayed when the array is accessed by its Key Data Set. Each of these linked Data Sets in turn provides a contiguous connection to another Array where the linked Data Set is the key Data Set. This allows the user to traverse these contiguous connections, thereby moving from one array to another having a common Data Set connection. These connections are complete; they are correct; and they are created automatically regardless of the type or nature of input data.

The Inversion process creates a duplicate set of inverse data relationships for every user input relationship. This provides for a self-healing database capability since the computer can be programmed using only commonly available techniques to compare Data Set Array's linked data set hierarchies and automatically detect and correct an imbalance between the rrelationships in the arrays and the inverted arrays which could arise from those power failures and other disturbances that can affect the integrity of any computer manipulated database.

DYNAMIC REORGANIZATION OF DATA SETS

The CCM maintains the Data Set Array file in alphanumeric sequence by Key Data Set. Within each Data Set Array, CCM physically maintains the Linked Data Sets in hierarchical alphanumeric sequence. This rearrangement is accomplished dynamically at each user input.

Because all data relationships are physically established and ordered within a Data Set Array through the input/inversion and reordering processes, all data and all data relationships are instantaneously displayed, i.e. relationships do not have to be derived. Moreover, since the Data Set Arrays all exist in a single file and are always in alphanumeric order, efficient search routines such as binary search can provide a nearly instantaneous location of any Data Set Array regardless of database size.

DATA CONTROL MODULE (DCM)

The CCM DCM allows the user to: impose constraints on data inputs and relationships, define Data Type restrictions, specify which Data Types will be subject to automatic Inversion and Global Linking (relationships maintained from one Data Set Array to another) and provide security to restrict database access and file maintenance capability by Data Type. The DCM is not required for application of the CCM; however, it provides tools to limit a specific database application to a user-specified subset of all possible data types and relationships.

GLOBAL LINK

In some applications it is useful to establish constant data relationships; i.e., to configure the computer so that, wherever a particular Data Set appears in the file, an associated Data Set appears with it. Global Linking enables the user to enter a Key-Link Data Set or Link-Link Data Set, relationship once and have that relationship automatically generated unconditionally wherever the Key Data Set exists in the file by consulting the key Data Set entries in the DCM.

AUTOMATIC CONNECTION PROJECTION

The Inversion process automatically creates a contiguous connection between all Data Set Arrays having a common Data Set link. Within a given array, there is a direct, physical link between Data Sets; and these relationships are immediately displayed when the array is accessed by its Key Data Set. Each of these Linked Data Sets in turn provides a contiguous connection to another array where the Linked Data Set is the key. The herein disclosed systems and methods allow the user to traverse these contiguous connections and thereby move from one array to another having a common Data Set connection. Depending on the nature of the data relationships that exist for a given enterprise and the input controls imposed through the DCM to reflect these relationships, all of the relationships that exist between all Data Sets within the file may or may not be physically reflected in a single displayed array, i.e. additional Data Set connections may exist via other arrays. This is significant because, depending upon the user's interest, it is not necessarily desirable that the user be able to see all connections to all Data Sets Arrays all the time.

The ACP feature seeks and projects any additional Data Set connections that may exist in any other arrays that provide additional information relative to the displayed array.

ADVANTAGES AND OBJECTS OF THE INVENTION

It was pointed out above that database management systems and methods employing the principles of the present invention are superior to those utilizing conventional DBMS methodologies in terms of flexibility, speed, and the automatic creation and display of implicit, as well as explicit, connections among user input data.

The use of generic data elements and a generic data structure eliminates the need for multiple record structures and multiple database indices. The index, the file, and the database are one and the same.

Because of its underlying design: the database can be directly accessed by any and all input data; new data types and relationships can be added at any time without change to the underlying database structure; an complex data relationships are instantly available to the user.

The system automatically creates complete and correct data connections, including connections that would not otherwise be apparent to system designers and users.

The single consolidated Data Set Array file provides for automatic reorganization of all data and data relationships during input, allowing nearly instantaneous data retrieval.

Complex data manipulation languages are not required since all Data Sets and their relationships exist and are available in the database and do not need to be generated by a data manipulation language.

Also, as stated above, it is by no means necessary that a computer driven system be employed to structure, store, access, modify data in accord with the principles of the present invention. This is significant because there are applications in which, because of cost and/or other considerations, the use of a computer for these purposes is contraindicated.

From the foregoing, it will be apparent to the reader that one important and primary object of the invention resides in the provision of novel, improved apparatus and methods in which computers are employed in the structuring, storing, accessing, modifying, and processing of data.

A related and also important object of the invention resides in the provision of apparatus and methods as characterized in the preceding object which provide increased flexibility and increased speed in the retrieval of data and which are capable of automatically creating and displaying relationships among data that are not made evident by heretofore available systems and methods for managing data.

Still other important but more specific objects of the invention reside in the provision of systems and methods as characterized in the preceding object:

which eliminate the need for the multiple record structures and separate database indices required by heretofore available, computer driven systems and methods for managing data;

which requires only two generic data elements;

which provides a database that can be directly accessed;

which allow new data, new types of data, and new relationships among elements of data to be added to an existing database at any time and without changing the underlying structure of the database;

which are capable of making complex data relationships readily available to the user;

which, in conjunction with the preceding object, are capable of automatically creating complete and correct data element connections;

which, in conjunction with the two preceding objects, are capable of making data element connections that would not otherwise be apparent to database management system users and designers;

which employ only a single data file and are capable of reorganizing all data and data relationships as data is inputted to the file, thus providing for nearly instantaneous data retrieval;

which do not require the complex data manipulation language needed to define relationships in heretofore available systems and methods for managing data; and which have a short and steep learning curve as far as the user is concerned.

Still other important objects of the present is the provision of novel, improved methods for structuring, storing, accessing, modifying, and processing data which can be carried out with the aid of other physical systems instead of using one that is computer based.

Other important objects and features and additional advantages of the invention will be apparent to the reader from the foregoing and the appended claims and as the ensuing detailed description and discussion proceeds in conjunction with the accompanying drawings.

BRIEF DESCRIPTION OF THE DRAWINGS

In the drawings:

FIG. 3 is a diagram depicting the structure of a Data Set Array showing the indentured relation of N linked Data Sets in the array to the Key Data Set of the array;

FIG. 4 is a hierarchial tree graph of the Data Set Array depicted in FIG. 3;

FIG. 6 is a diagram containing a representative example of a Data Control Module employed in accord with the principles of the present invention to control the input of data to a database and the manipulation of that data;

FIG. 7 diagrammatically depicts the Data Set relationships allowed by the Data Control Module in the representative example of FIG. 6;

FIG. 8 is a reference key for FIGS. 8A and 8B;

FIG. 9 is a reference key for FIGS. 9A and 9B;

FIG. 10 is a pictorial depiction of a set of file cards bearing an original data set array and a set of cards bearing an inverted data set array, both components of file card system for mechanically structuring, storing, accessing, modifying, and processing data in accord with the principles of the present invention.

DETAILED DESCRIPTION OF THE INVENTION

Figure 1:
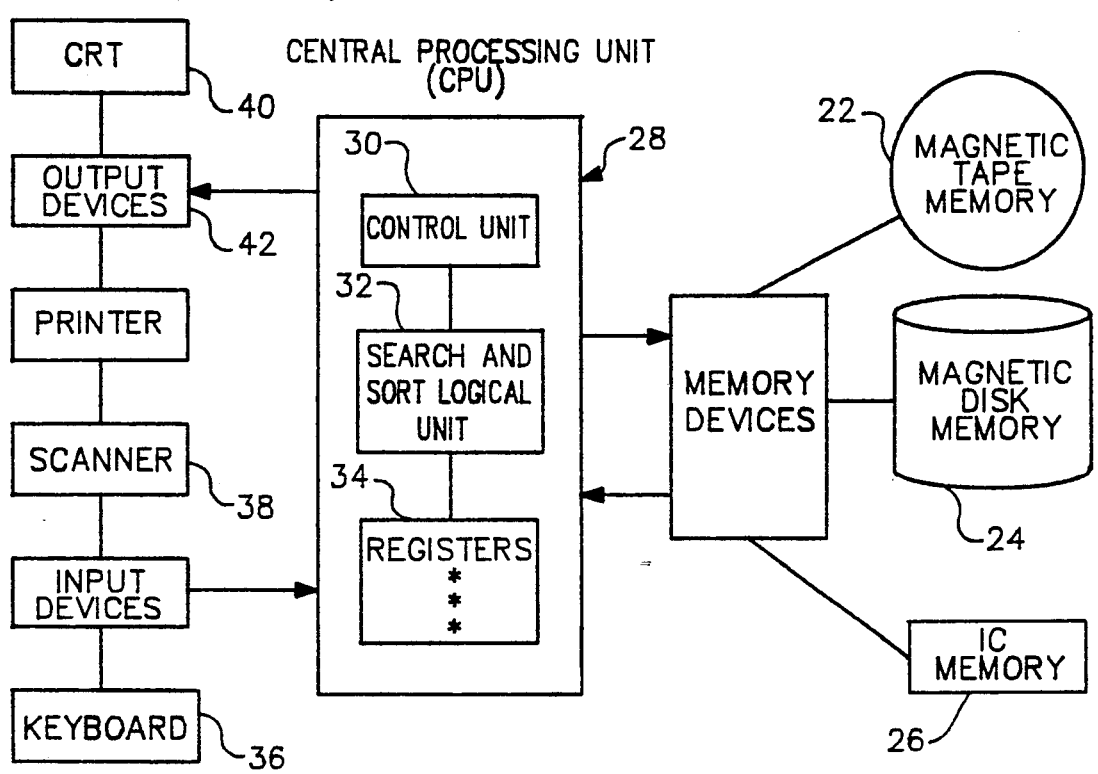
FIG. 1 is a schematic view of one representative computer for managing data in accord with the principles of the present invention; this computer has input and output devices, storage devices, memory devices and a central processing unit.

Referring now to the drawing, it was pointed out above, that the present invention relates in one aspect to novel, computer-based systems for managing large sets of source data by way of an approach which uses only two necessary and essential data elements in a database management system that generates a single ordered file. FIG. depicts one representative system 20 for managing data in the manner just described. That system includes one or more memory devices such as the illustrated magnetic tape and magnetic disk memory devices 22 and 24. The memory device provides a data file storage area.

System 20 also has: an IC (integrated circuit) or other memory device 26 supplying a data manipulation area; a central processing unit (CPU) 28 with a control unit 30, a search and sort logic unit 32, and registers collectively identified by reference character 34; input devices such as a keyboard 36 and/or scanner 38; and one or more output devices such as the illustrated monitor 40 and/or printer 42. Although any number of currently available processors can serve as the rearrangement CPU, the Intel 8086/88 family of microprocessors is particularly well suited.

As discussed above, the present invention consists of novel methods for managing data as well as computer-based systems for accomplishing that task. The features which, alone and in combination, constitute and make those novel methods unique are:

Generic Data Structure (consisting of two generic data elements and a generic data set array)
Indentured Relationships
Inversion of Data Set Relationships
Dynamic Reorganization of Data Sets
Data Control Module
Global Linking of Data Sets
Automatic Connection Projection These features and the roles they play in the data management methods of the present invention were discussed briefly above. They, and the methods in which they are incorporated, are described in detail below.

GENERIC DATA STRUCTURE—DATA SETS

Figure 2:
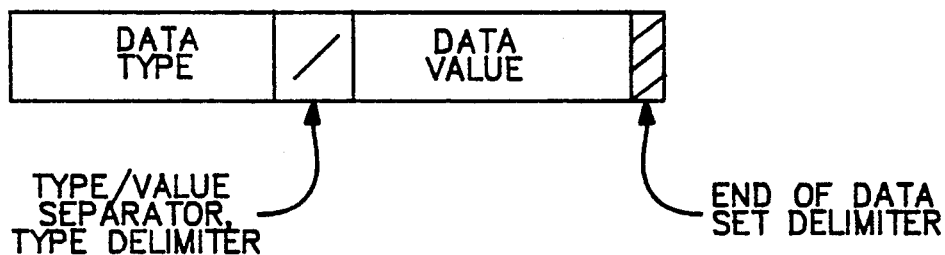
FIG. 2 is a diagram depicting the structure of a Data Set employed by a computer in managing data in accord with the principles of the present invention.

Referring now to FIG. 2, it was pointed out above that the data management methods disclosed herein employ a model (the CCM) which is unique in that it replaces data fields and separate field name files with a single entity called a Data Set. This entity consists of two integral (inseparable), generic, variable length data elements—Data Type and Data Value—; and it may have additional data elements. These may be useful but are not essential.

The Data Type is a designator used to differentiate one type of subject matter from another; e.g., teacher from student from course grade, etc. The Data Type is a user-specified name, acronym, or abbreviation used to define a particular subject matter, much the same way that a field name defines the data in a conventional record structure. However, unlike a field name in conventional database structures, the Data Type is itself a piece of processable data. The Data Type element can accept any variable length alphanumeric or binary data, regardless of subject matter (i.e., it is subject matter (data) independent). The Data Type is delimited by a unique character or binary number to separate it from the Data Value.

The Data Value is the value of a particular Data Type. The Data Value differentiates one instance of a Data Type from all other instances of that Data Type in the database; e.g. [655 SE 102] AND [120 ELM STREET] are unique Data Values for Data Type [ADDRESS]. The Data Value is subject matter (data) independent and can accept variable length alphanumeric or binary data such as text data or numbers, image data, voice data, or any other data which can be represented by a string of binary numbers. The Data Value is delimited by a unique character or binary number to indicate first the end of the Data Value and subsequently the end of the Data Set.

Each Data Set consists of a unique, dynamically defined instance of the Data Type/Data Value construct. Unlike other systems, this combination is always stored and processed as a composite unit. The structure and definition of the Data Type and its associated Data Value are encapsulated within the Data Set. Processing Data Sets is thus independent of and protected from the structure of the source data. Such a strategy eliminates the complexity inherent in other large databases that contain many different types of source data.

The CCM DBMS thus provides a self-describing database that carries the definition of the source data as well as the value of the source data in a single composite Data Set; e.g., [NAME/JOHN DOE]. A Data Set is subject matter (data) independent and can accept variable length alphanumeric data in both the Data Type portion and Data Value portion. The Data Set is roughly comparable to a data record in a convention DBMS because Data Sets may be regarded as "generic" records. The term Data Set is used instead, however, because the software that processes a list of Data Sets need not know ahead of time the type of data contained in the single generic (i.e., data-independent) record structure that it is processing. Instead, when it reads the Data Set, it determines the data type.

Although not required, the generic Data Set can contain additional user-defined generic data fields in addition to the Data Type and Data Value fields. These fields are always defined in the third and subsequent position of the generic Data Set as the Data Type and Data Value fields positions are fixed. An example of an optional additional generic data field is a variable length DESCRIPTION text, this field providing additional descriptive data for a given Data Set; e.g.:

Data Type: Course
Data Value: ACCT-103
Description: Introduction to principles of Cost Accounting.

The physical notation [DATA TYPE/DATA VALUE] will be used to describe Data Sets throughout the discussion which follows.

DATA SET ARRAYS AND INDENTURED RELATIONSHIPS

Today, all computer-based business records are based on the standard data structure where characters are grouped into fields which are in turn grouped into records. Whether the data is structured for file or database processing, it is always grouped into records. As noted, sometimes terms that are synonymous with record are used. Such synonyms include segment (DL/T), tuple (theoretical relational model), and row (commercial application of the relational model).

The CCM of the data management systems and methods disclosed herein departs substantially from this way of relating data. Specifically, no record construct for data relationships is defined. Instead, Data Sets are indentured to other Data Sets in Data Set Arrays. The indenturing feature provides a hierarchy of Data Sets within an Array. Thus, no additional data elements or pointers are required to allow for an endless set of source relationships.

A Data Set Array is a variable length, hierarchically structured list of Data Sets. An example Data Set Array of manufacturer data is:
[MFR/GE]
- [LOCATION/SEATTLE, WA]
- [MFR-PN/82A-26]
-- [COST/30.00]
-- [NSN/12345678]
--- COST/24.00]
-- [SUP/PORTLAND PARTS]
--- [SUP-PN/26-82A]
---- [COST/42.35]
-- [SUP/SEATTLE PARTS]
--- [SUP-PN/AAA-1]
---- [COST/27.35]
- [PHONE/456-1234]

This Data Set Array is mapped into linear address space in memory and to formatted physical subdivisions of real recording media as contiguous strings (see FIGS. 3 AND 4). Data Sets within the Data Set Array are delimited by end-of-Data-Set delimiters and/or start-of-Data-Set hierarchy designators. These delimiters and designators can be any unique character or binary number.

Depending on its position in the hierarchy of a Data Set Array, a Data Set is considered to be either a Key Data Set or a Linked Data Set. By definition, a Data Set Array consists of a single Key Data Set and zero or more indentured, Linked Data Sets making up a hierarchy within the Array.

Key Data Sets are Data Sets used to access the database. A Key Data Set holds the "top" position in the hierarchy of a Data Set Array; all other Data Sets are subordinated to the Key Data Set in a Data Set Array.

Linked Data Sets are Data Sets describing the Key Data Set and holding any position subordinate to the Key Data Set in the hierarchy of a Data Set array; e.g.:
[MFR/GE] Key Data Set
- [LOCATION/SEATTLE, WA] Linked Data Set
-- [ADDRESS/165SE10] Linked Data Set
- [PHONE/206-456-1234] Linked Data Set The above notation showing physical indentation and dashes (−) as the hierarchy delimiters is used to illustrate Key Data Set and Linked Data Set associations throughout this specification.

Linked Data Sets in a Data Set Array may describe the Key Data Set directly; i.e., [LOCATION/SEAT- TLE, WA] and [PHONE/206-456-1234] directly describe [MFR/GE]; or they may describe the Key Data Set indirectly; i.e., [ADDRESS/165SE10] describes [MFR/GE] only via the intermediate Linked Data Set [LOCATION/SEATTLE, WA]. [ADDRESS/165SE10] links to and thus describes [MFR/GE] [LOCATION/SEATTLE, WA] but only relative to and by way of this Data Set Array. In other words, all Linked Data Sets in a given Data Set Array, regardless of the level of the hierarchy at which they exist, describe the Key Data Set. Each Linked Data Set describes the Key Data Set by its exact location within the hierarchy as delimited by hierarchy designators (it should be noted that these hierarchy designators normally denote hierarchy by the number of such designators leading the linked Data Set; i.e., if one designator leads the linked Data Set, it is one level below the Key Data Set, if two hierarchy designators lead the linked Data Set, it is two levels down, etc.). Use of this approach does not restrict encoding other data in the hierarchy designator such as a specific value assigned to this hierarchy designator to denote relationship direction or relationship type or weight. This approach differs substantially from the conventional record structure where each field is directly subordinate to the key field, making all fields other than the key field exist at one and the same level. Additional data elements are then required in conventional databases to interrelate fields within any one record.

In the generic Array depicted in FIGS. 3 and 4, as in all CCM Arrays, there is no structure resembling a conventional record. The only grouping of Data Sets that exists within the database is the Data Set Array in its entirety. The CCM is the only model that groups data in this way. The unique result is that the source data, the source data relationships, and the source data description are all contained in any one Data Set Array.

The CCM is based upon a strategy for representing data relationships that is new and different from strategies used to date. All existing schemes involve separate data indexes or dictionaries to identify source data relationships or pointers to maintain relationships among records. In the CCM, relationships are defined as existing between Data Sets in a hierarchically structured Data Set Array and not between conventional records which contain many data elements in a linear relationship.

Figure 5:
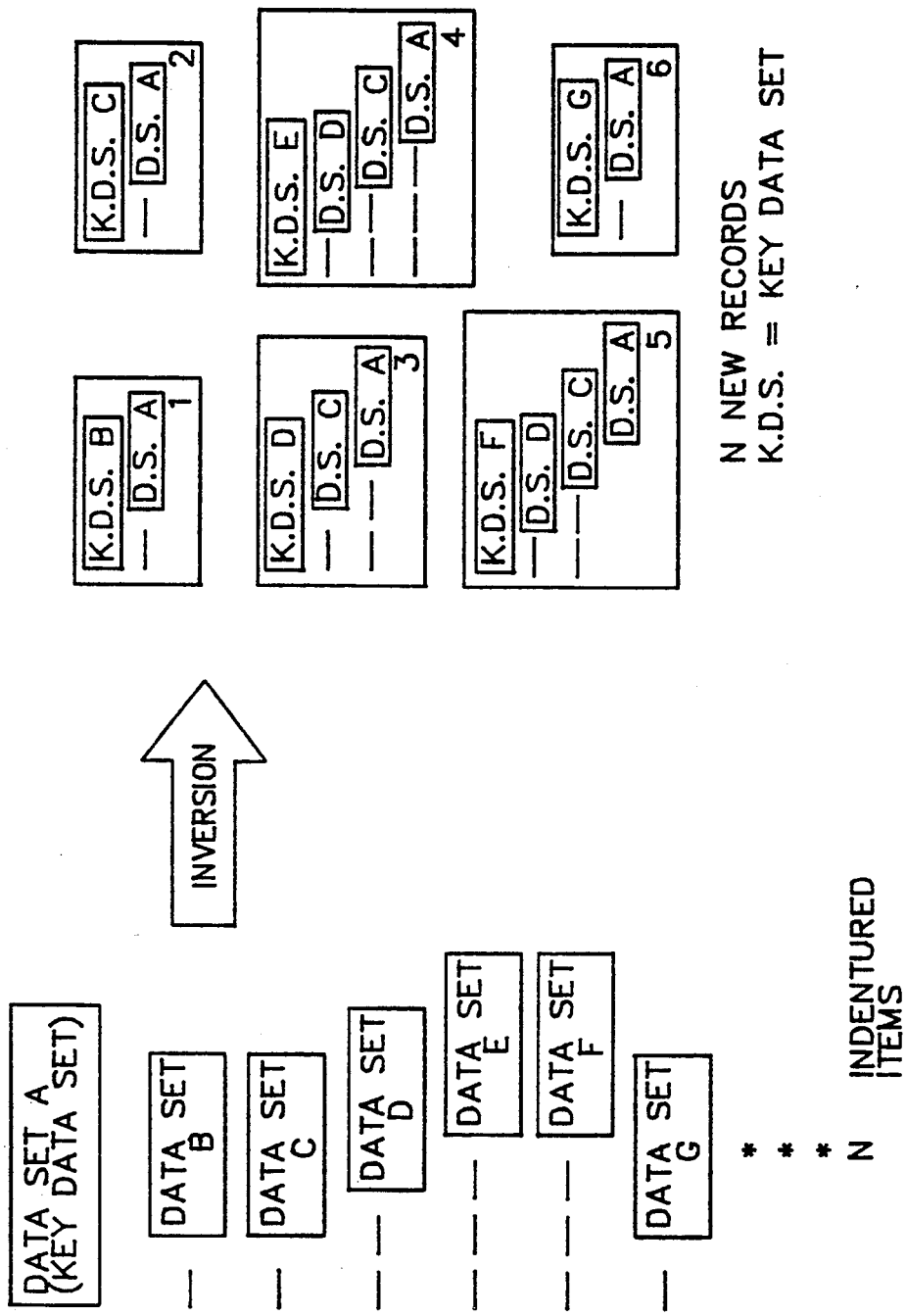
FIG. 5 is a pictorial representation of a Data Set Array and Inverted Data Set Arrays created therefrom by inversion in systems and methods employing the principles of the present invention.

INVERSION OF USER INPUT (see FIG. 5)

The Key Data Set is used to locate a Data Set Array and, as such, it acts as the search key. In order to maximize access to data in Arrays, the systems and methods of the present invention use CCM to create the inverse relationships between Key Data Sets and Linked Data Sets within any Array. This methodology is called Inversion in this specification, and it is distinctly different from inverted indexes in conventional databases. In preferred embodiments of this invention, data entry is performed by first selecting a Key Data Set, displaying the associated Data Set Array with all linked data sets shown in hierarchical order and then selecting a position in the displayed hierarchy to insert a new Data Set having the data to be entered. When the Data Set is entered into the database, Inversion creates an inverse key-link relationship by automatically creating (or updating) a Data Set Array with: (a) the entered Data Set as the Key Data Set, and (b) the original Key Data Set and any direct intermediate Linked Data Set predecessors which are higher in rank to the newly entered Data Set in the hierarchy making up the original Array as the new Linked Data Sets (parents, grandparents, etc.), those new Linked Data Sets being inverted to form inverse relationships. Only the Data Sets in the original Data Set Array hierarchy that are above the newly entered Data Set are inverted. By employing Inversion, access to any array can be obtained via any Data Set input to the system, by direct search of the Key Data Sets, and by display of the Data Set Array.

Consider, for example, the [MFR/GE] Data Set Array:

MFR/GE] Key Data Set
-[LOCATION/SEATTLE, WA] Linked Data Set
-- [ADDRESS/165SE10] Linked Data Set
- [PHONE/206-456-1234] Linked Data Set The Data Set Array created by Inversion of [LOCATION/SEATTLE, WA] at the time it is input (linked) to Key Data Set [MFR/GE] is:

[LOCATION/SEATTLE, WA] New Key Data Set
- [MFR/GE] Linked Data Set

The Data Set Array created by input and Inversion of [PHONE/206-456-1234] is:

[PHONE/206-456-1234] New Key Data Set
[MFR/GE] Linked Data Set

The Data Set Array created by input and Inversion of [ADDRESS/165SE10 ] is: [ADDRESS/165SE10] New Key Data Set
- [LOCATION/SEATTLE, WA] Linked Data Set
-- [MFR/GE] Linked Data Set Notice that the intermediate original Linked Data Set [LOCATION/SEATTLE, WA] maintains a linked intermediate position in the new [ADDRESS/165SE10] Data Set Array.

Every unique Linked Data Set also exists as the Key Data Set in a Data Set Array. This enables access to all explicit relationships in the database directly —no derivation of the relationships is required.

The Inversion process also integrates under a common Key Data Set all Data Sets from all Arrays that contain a common Linked Data Set. For the part manufacturer example, if Data Set Arrays:

[MFR/GE] Key Data Set
- [LOCATION/SEATTLE, WA] and Linked Data Set MFR/WE] Key Data Set
- [LOCATION/SEATTLE, WA] Linked Data Set are entered with the common Linked Data Set [LOCATION/SEATTLE, WA], Inversion creates the following Data Set Array:
[LOCATION/SEATTLE, WA] Key Data Set
- [MFR/GE] Linked Data Set
- [MFR/WE] Linked Data Set The process of inverting each input link automatically creates a contiguous connection among all of those Data Set Arrays in the data which have a common link. In the above example, an implicit relationship is established between [MFR/GE] and [MFR/WE] through the common connection with [LOCATION/SEATTLE, WA]. The term "implicit relationship" means that there is a common relationship between the two manufacturers and the location but that this relationship is not dependent upon the existence of the other manufacturer. On the other hand, the act of indenturing (linking) one Data Set to another Data Set establishes an explicit or conditional relationship. In this case, any change to the indentured relationship would cause an equal change in the explicit relationship which is contained in the inverted Key Data Set Array.

DYNAMIC REORGANIZATION OF DATA SET ARRAYS

Data Set Arrays are stored sequentially in a single file in systems and by methods employing the principles of this invention and maintained in logical alphanumeric order in storage and in the data manipulation area (memory) by Key Data Set (Data Type and then, subordinately, Data Value). Within Data Set Arrays, all Linked Data Sets are physically stored in hierarchical alphanumeric order. This structure provides rapid access to all Data Set Arrays and Data Set relationships in the database since source data is always in order. The following examples illustrate several Data Set Arrays arranged in logical order.

Key Data Sets Linked Data Sets
[LOCATION/TACOMA, WA]- []-- []--- []. . .
[MFR/GE]- []-- []--- []. . .
[MFR/WE]- []-- []--- []. . .
[MFR-PN/655ABC]- []-- []--- []. . .
[MFR-PN/82A-26]- []-- []--- []. . .

Note that each of the Key Data Sets could have many Data Sets hierarchically linked to and indentured under it.

A Data Set Array with a Key Data Set and indentured linked Data Sets in logical order is: MFR/GE] Key Data Set
- [LOCATION/SEATTLE, WA] Linked Data Set
- [MFR-PN/82A-26] Linked Data Set
-- [COST/30.00] Linked Data Set
-- [NSN/12345678] Linked Data Set
--- [COST/24.00] Globally Linked Data Set
-- [SUP/PORTLAND PARTS] Linked Data Set
--- [SUP-PN/26-82A] Linked Data Set
---- [COST/42.35] Linked Data Set
-- [SUP/SEATTLE PARTS] Linked Data Set
--- [SUP-PN/AAA-1] Linked Data Set
---- [COST/27.35] Linked Data Set
- [PHONE/456-1234] Linked Data Set The single Data Set Array File and the order of all Linked Data Sets within all Data Set Arrays are both dynamically reorganized as the user enters new data or changes existing data. The Data Set Array File and all Linked Data Sets within a Data Set Array are always physically maintained in logical order to facilitate fast data retrieval and display. Initial input of Data Sets and all succeeding input is sorted and arranged in hierarchial order at the time of entry Such reorganization is done by sorting Data Set Arrays and shifting and inserting Data Sets within Data Set Arrays, using the generic rearrangement CPU 28 in system 20 (see FIG. 1).

Like sequential lists, Data Set Arrays may be grouped into blocks with growth space between them to allow for expansion of a Data Set Array without total rearrangement of the database.

DATA CONTROL MODULE (DCM)

Figure 8A:
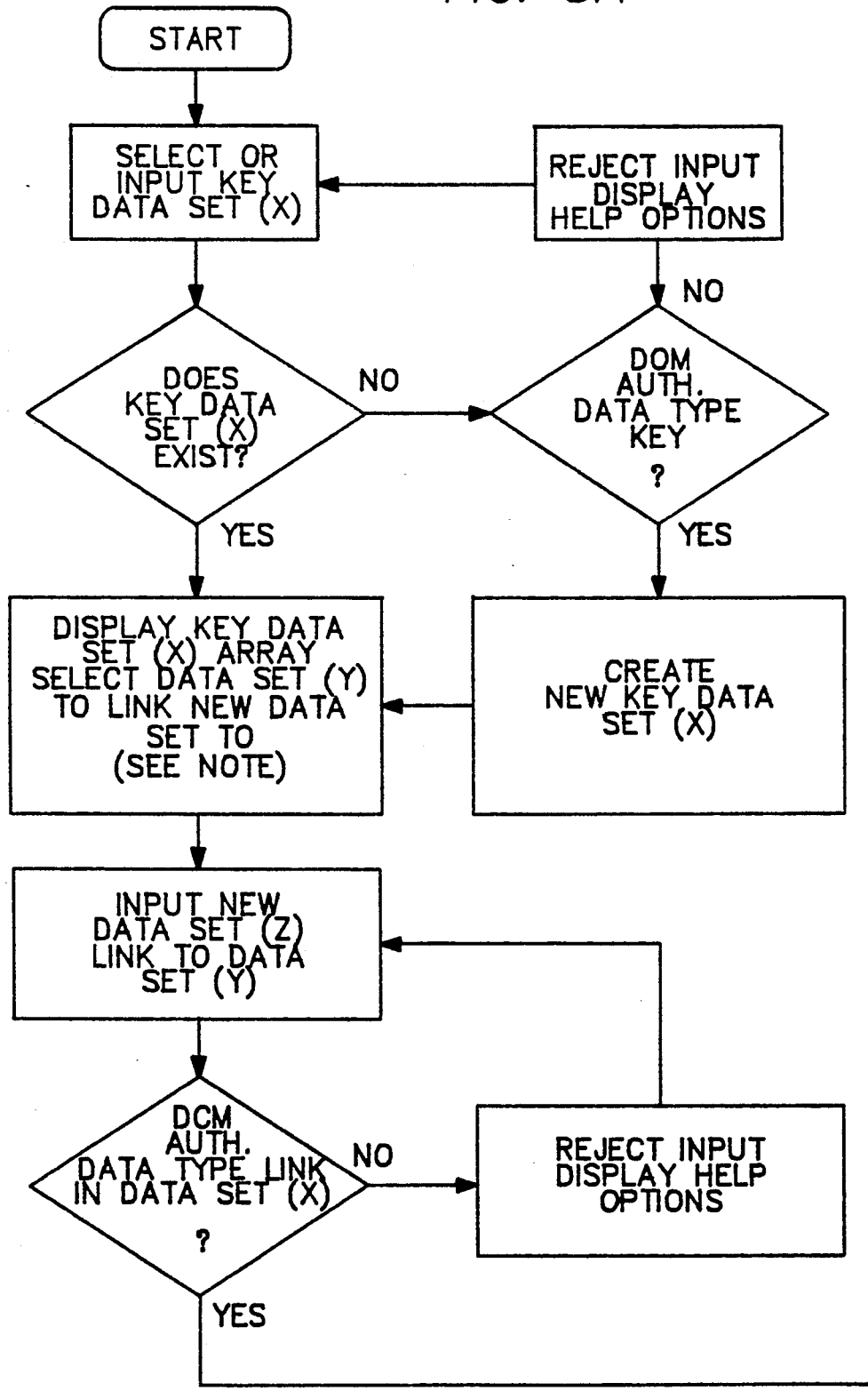
FIGS. 8A and 8B, taken together constitute a flow chart of input/inversion and global linking processes carried out in managing data in systems and by methods employing the principles of the present invention.
Figure 8B:
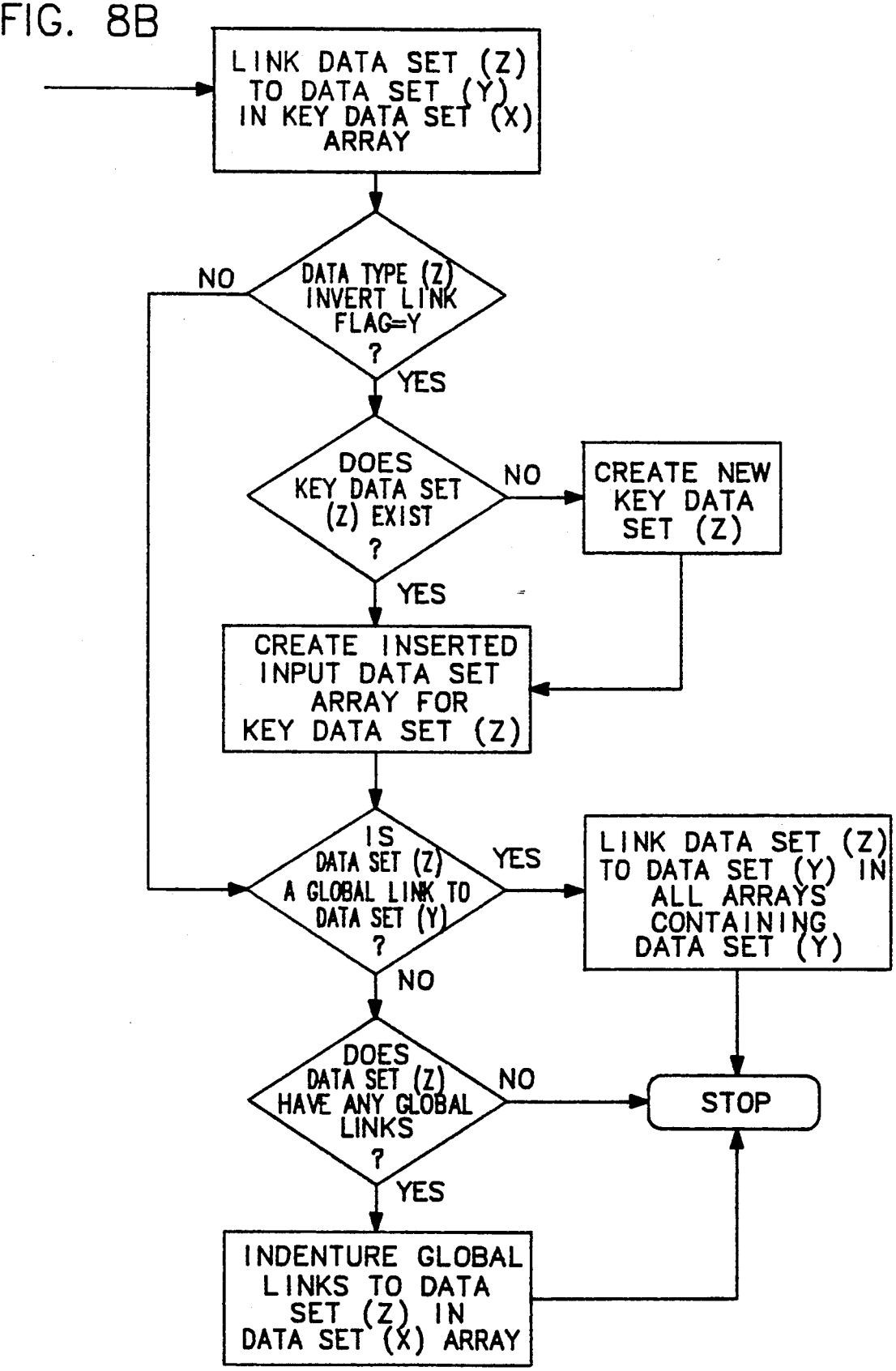

In the present invention as thus far defined, no restrictions are put on the possibility of all Data Sets being related to all other Data Sets. This allows for the existence of up to N Data Set Arrays with N squared possible links. Although not mandatory, the DCM contains user defined and selected controls or constraints on the relationships that can be created among Data Set Arrays. In appropriate circumstances, this may make it possible to more easily create and manage the logical architecture of the Data Set Arrays that make up a database. When the DCM is enabled, it provides features for:

Allowed Data Types
Data Value Format Checks
Data Type Input Indenture Controls
Invocation (On-Off) of Inversion of Data Types
Invocation (On-Off) of Global Linking Data Types
Security by Data Types FIGS. 6 and 7 pictorially depict a typical DCM, and FIG. 8 shows how the DCM controls data input, inversion, and global linking.

The DCM and Global Linking rules (defined below) are embodied in a separate variable length file of Data Set rules. This set of rules can be organized as an indexed sequential or CCM configured file which is consulted by the computer at the time of Data Set input to the database.

Allowed Data Sets, Indenturing rules, and invocation of Inversion and Global Linking may be changed at any time, not just at initial system setup. For example, a new Data Type can be inserted at any level in an established Data Set Array hierarchy As the new Data Set, consisting of a New Data Type and Data Value, is inserted in the array, all other levels of that array and all inverted arrays affected by this change are adjusted accordingly. It is important to note that the DCM does not define data types nor define relationships as conventional data dictionaries do, but instead puts constraints on possible relationships based on user-defined data constraints.

Allowed Data Types

Acceptable Data Types are defined in the DCM. New Data Types can be added to the DCM at any time without any change to the database structure or software.

Data Type Input/Indenture Controls (Array Hierarchy)

Acceptable links between Data Types are defined through the DCM input and indenture controls. For example, it may be appropriate to link Data Type [COST] to Data Type [MFR-PN] but inappropriate to link Data Type [COST] directly to Data Type [MFR]. This constraint on relationships between Data Types would be defined in the DCM.

Data Type relationships are defined as acceptable only with certain Key Data Set Arrays. In the DCM shown in FIG. 6, for example, [NSN] is defined as an acceptable link to [MFR-PN] but only within Key Data Set Arrays having [MFR] as the Key Data Type. This signifies that [NSN] depends on both [MFR-PN] and [MFR]. On the other hand, [PHONE] can be directly linked to [MFR] within [MFR] Key Data Set Arrays, indicating that the relationship between [PHONE] and [MFR] is independent of all other Data Types defined in this example. As a part of the system setup process, the user should define the Data Types (others can be added at any time) and also consider data relationships and dependencies to determine the best strategy for entering and managing the data. By controlling the linking or indenturing of Data Types, the DCM controls the allowed hierarchy of each Data Set Array and, thus, the relationships throughout the entire database.

Invocation (On-Off) of Inversion of Data Types

Turning inversion "on" or "off" for a Linked Data Type is controlled through the DCM. With inversion "on" for a Data Type, input of a linked Data Set with the identical Data Type results in a new or updated inverted Data Set Array with the Key Data Set equal to the input linked Data Set. With inversion "off" for a Data Type, computer generated inverse Data Seta Arrays will not be created as a part of the input process. For example, a user may not want to invert Data Type [COST] because [COST] is linked to many Data Types from [NSN] to [MFR-PN] and other Data Types with cost. In this case, a user would always want [COST] information relative to one of these other Data Types say, [MFR-PN], and thus would first access by Data Type [MFR PN].

Invocation (On-Off) of Global Linking of Data Types

Turning Global Linking "on" or "off" for a pair of Data Types is controlled in the DCM. In the DCM shown in FIG. 6, for example, Global Linking is turned "on" for Data Type [COST] to Data Type [NSN]. This means that once a specific cost is linked to a specific NSN in the NSN's Key Data Set Array, that cost will automatically be indentured to that NSN wherever that NSN is linked. The user's initial input of the Global Link may or may not be inverted, depending on whether inversion is turned "on" or "off" for Data Type relationship in the DCM. Candidates for Global Linking are those Data Types, such as cost that do not depend on any other relationships in the file.

Security by Data Type

For each Data Type, the DCM allows the user to establish control over database access and file maintenance functions.

GLOBAL LINKING OF USER INPUT

As discussed above in the section describing the DCM does not predefine relationships between Data Sets. However, in some applications it may be useful to establish constant data relationships so that, wherever a particular Data Set appears in the file, an associated Data Set appears with it. For example, it may be desirable to have a code and its translation appear together at all times without having to input the translation each time the code is applied. That feature is called Global Linking in this specification. Global Linking enables the user to enter a Key-Link Data Set relationship once and have that relationship automatically generated wherever that Key Data Set is linked in the file.

For instance, in the part manufacturer example, if [NSN/12345678] is globally linked to [COST/24.00] in the Data Set Array in which [NSN/12345678] is the Key Data Set, the Global Linking process, using the [NSN/12345678] as the look-up key, seeks out all Data Set Arrays in which [NSN/12345678] is already linked and automatically indentures [COST/24.00] to [NSN/12345678] in those Arrays.

AUTOMATIC CONNECTION PROJECTION (ACP)

Figure 9A:
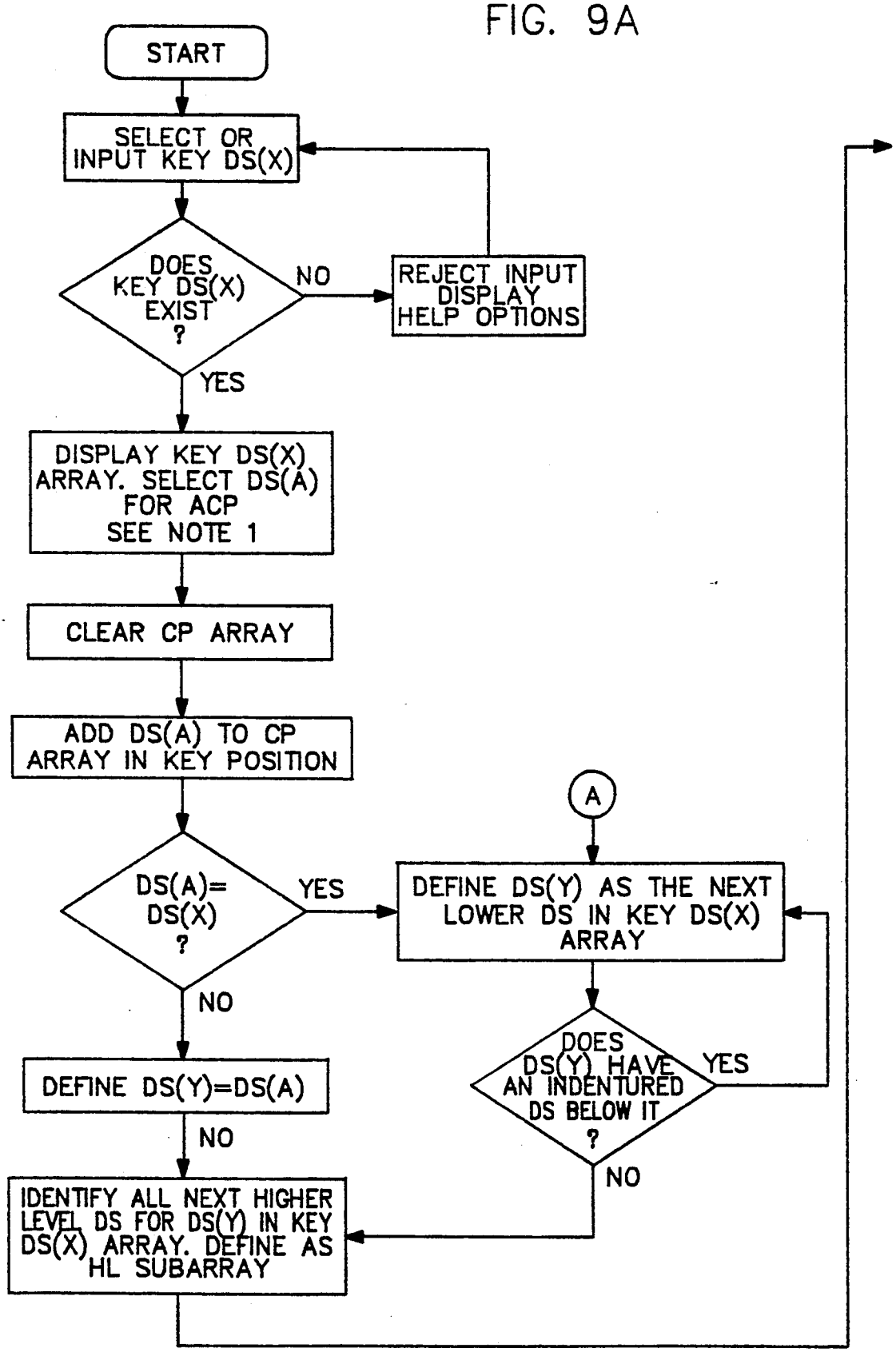
FIGS. 9A and 9B, taken together, constitute a flow chart of an automatic connection projection carried out by those systems and methods.
Figure 9B:
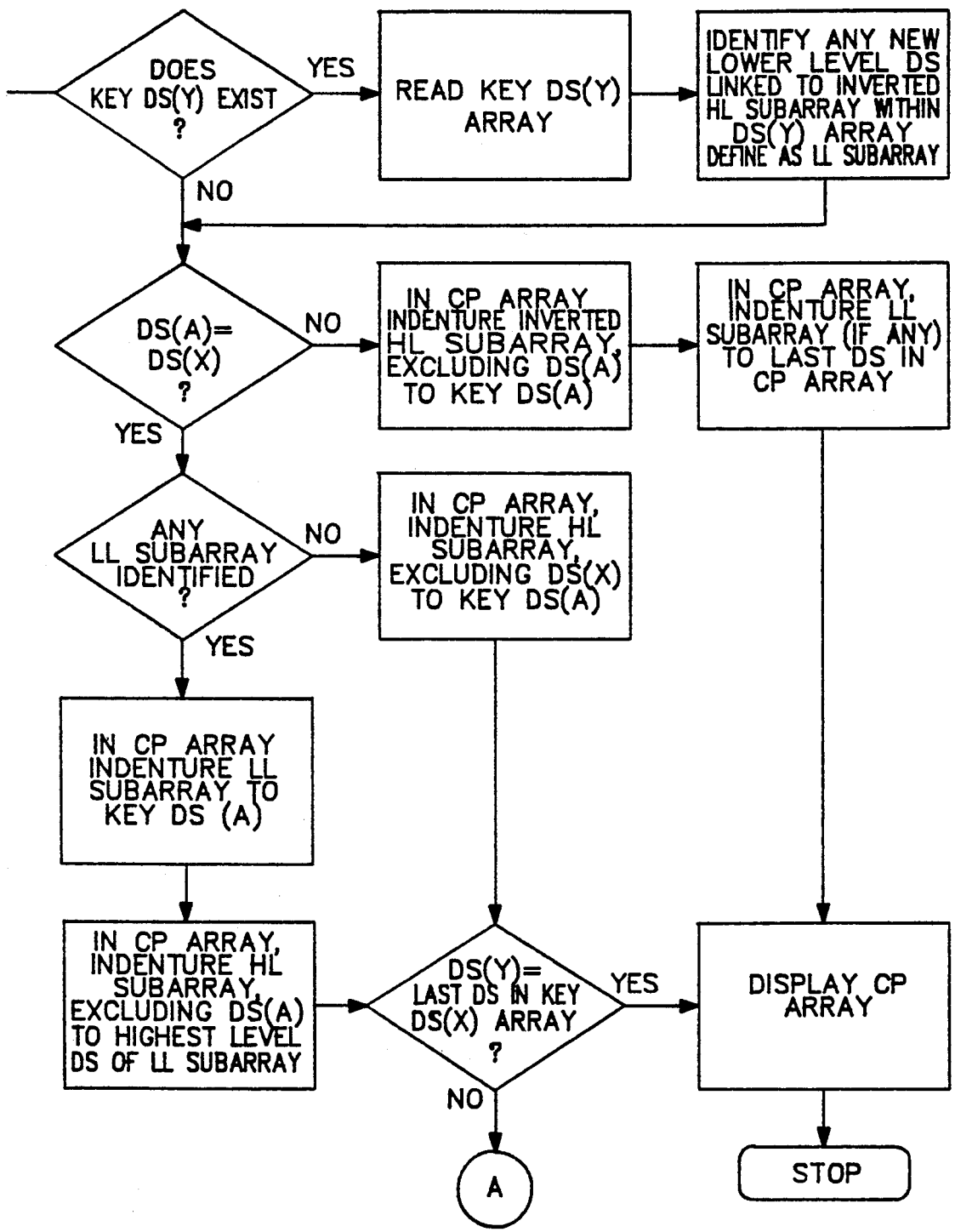

The ACP of this invention searches using linked Data Sets within the array being viewed as look-up Key Data Sets and projects additional Data Set connection(s) that may exist in any other arrays and thereby provides additional information relative to the projection perspective. The ACP process, illustrated in FIG. 9, creates an on-call view of all Data Set relationships within the database from a single access array.

The ACP searches for and projects additional Data Sets that may exist in other inverted Data Set Arrays that are relevant to each linked Data Set in the Data Set Array DS(X) being viewed. This is done automatically with no user defined query. The process only requires that the user identify a single Data Set, which may be a linked Data Set or the Key Data Set, from the Data Set Array being viewed. The result is a new temporary Data Set Array called a Connection Projection (CP).

Once a linked Data Set (DS(A)) is selected, ACP checks the Data Set Array file for a Data Set Array with a Key Data Set equal to the selected linked Data Set (DS(A)). If the Data Set Array exists, a search is made through it for the inverted higher level subarray (HLSUBARRAY) of the selected linked Data Set (DS(A) (for this discussion, a subarray is defined as the next chain of progressive links up or down a Data Set Array from a given Data Set; it may or may not include the Key Data Set). If the inverted higher level subarray matches, the system searches for any lower level linked Data Sets (LLSUBARRAY). The resultant display to the user is the Connection Projection Data Set Array composed of the Original Array and a Key Data Set equal to the original selected linked Data Set with the inverted higher level subarray being indentured to the Key Data Set and the lower level subarray being indentured to the last Data Set in the inverted higher level subarray.

If the original Key Data Set (DS(X)) is selected as the Data Set (DS(A)) for ACP, instead of a linked Data Set, ACP creates a combined view for each linked Data Set. To accomplish this, the ACP process selects each lowest level linked Data Set DS(Y) in the original Data Set Array (DS(X)). For each Data Set DS(Y), the higher level subarray (HLSUBARRAY) is identified; and, if Data Set DS(Y) exists as a Key Data Set, the lower level subarray (LLSUBARRAY) is identified in Data Set Array DS(Y). If a lower level subarray exists, it is indentured to the Key Data Set DS(A) in the Connection Projection (CP) Data Set Array, then, the higher level subarray is indentured to the first Data Set in the lower level subarray that was just added. If no lower level subarray exists, the higher level subarray is just indentured under the Key Data Set in the CP Data Set Array. When all lowest level Data Sets are exhausted, then the Connection Projection Data Set Array is displayed.

This new CP Data Set Array creates entirely new links beyond the existing direct parent-child relationships in the existing Data Set Arrays which are re-indentured to provide a non-distorted, simultaneous collective view of the information. This displays to the user relevant Data Sets from both the original Data Set Array perspective and its related inverted Data Set Arrays which may contain additional relevant data.

SUMMARY

To summarize, the novel data management systems and methods of the present invention have, and are distinguished from existing and heretofore proposed systems and methods by:
Means for combining data type and data value into a single construct called a Data Set.
Means for ordering Data Sets in memory and in storage to define Data Set relationships
Means for creating access paths to related Data Sets by inversion of parent-child relationships
Means for maintaining correct Data Set relationships in memory and in storage Means for manipulating, inserting, deleting, and changing Data Sets and Data Set relationships in memory Means for manipulating complex Data Set types such as images and other non-text Data Sets by using a header length Data Set Means for managing Data Set relationships based on an external world model via a DCM Means for automatically creating specific predefined Data Set relationships An ACP for analyzing Data Set relationships to determine inferred relationships between disparate Data Sets The DCM which controls the data input, linking, and inversion processes (see FIG. 6) typically also includes other user invoked controls which are not by themselves part of the present invention. These are:

Data Type—User-defined Data Type designator

Data Value format checks

Description—Generic description of the Data Type

Key Data Type—Yes or No. If the Data Type is designated as a key, it can be initially input to the database as a key without regard to linking limitations Linking Limitations Links to—Defines what Data Type(s) a Data Type can be linked to Within Key Data Set - Defines by Data Type where the link must be made in a Key Data Set Array Invert Link—Defines whether the authorized link will be inverted to create a new/updated array Global Link—Defines whether or not the link will also be globally linked within all other arrays containing the linked Data Sets

EXAMPLES

General

The examples which follow show in detail how a system employing the principles of this invention, such as the system 20 illustrated in FIG. 1, can be used in a simple but real world database application. The application described here is a classic many-to-many relationship problem revolving around a single manufactured part. This part has a National Stock Number [NSN], multiple manufacturers, multiple manufacturer part numbers and costs, multiple suppliers for each manufacturer of the same part, and multiple suppliers' part numbers and costs. This is further complicated by the fact that a single supplier may carry multiple manufacturer's versions of an identical part with different part numbers and different costs.

The examples deal with the management of one part with a single National Stock Number, two manufacturers of this part (each with associated part numbers and cost), and three suppliers of the part (each with associated part numbers and costs). The examples also involve tracking location and phone data relative to each manufacturer and supplier.

Relationships are defined in the DCM. FIGS. 6 and 7 illustrate the initial DCM setup for this example. FIG. 8 presents the data input, inversion, and global linking process.

If the DCM is turned-on, all data input through this process is checked against the DCM to ensure the integrity of input data and data relationships. In the absence of any linking limitations imposed by the user through the DCM, any Data Set could be linked to any other Data Set in any Data Set Array. Data input and linking controls are often a key practical feature of this invention from a database management perspective, but such controls are not essential.

A Key Data Set Array can be established for any Data Type whose Key Data Type Flag is set to "Y" in the DCM without regard to any linking action or limitations. For example (see FIG. 6), Key Data Set Arrays can be established for manufacturers (Data Type MFR]) and then for all manufacturer part numbers (Data Type [MFR-PN], and the two can later be linked in accordance with the DCM-defined linking limitations, if any. Data Types that are not defined as a Key Data Type can be input only through the linking process (see FIG. 8).

FIG. 6 illustrates both the Data Types and their relationships for this example. Once the DCM has been set up, the data input linking and inversion process defined in FIG. 8 can begin. In this example (as in any real world environment), the initial definitions of Data Types and their relationships are a function of the nature of the data itself. The object here is to set the DCM to reflect the natural and logical relationships that actually exist between any two Data Types.

As the Data Types and their relationships are defined in the DCM, the CCM system creates and maintains a template of the authorized Key-Link input hierarchy for each Key Data Type. These hierarchies define the generic data relationships and can be viewed directly through the DCM display functions. FIG. 7 presents the composite DCM data relationships for this example.

EXAMPLES I-IV—DATA SET ARRAY FILE CREATION

The following examples illustrate the creation of a Data Set Array File using the processes depicted in FIGS. 6, 7, and 8. The double colons (::) indicate the Data Sets input by the user and the resulting inversion.

EXAMPLE 1
SEARCH, DISPLAY, INSERT, AND SORT WITH INVERSION, GLOBAL LINK, AND DCM ACTIONS

The following example illustrates the creation of a Data Set Array File. The double colons (::) indicates the Data Sets input by the user.

| User Input | Data Set Array Input/Displayed By User | New or Existing Array Resulting from Automatic Inversion |
|---|---|---|
| 1 = | [MFR/GE] | [MFR-PN/82A-26] |
| 2 = | ‑ [MFR-PN/82A-26] | ‑ [MFR/GE] |
| 3 = | [NSN/12345678] | No Inversion of [COST] |
| 4 = | ‑ [COST/24.00]** | in accordance with DCM. |

**NOTE: Because [COST] is flagged in the DCM as a Global Link to [NSN], the Global Linking process would seek out all other occurrences of [NSN/12345678] in the Data Set Array File and automatically indenture [COST/24.00] to them. Since there are no other occurrences of [NSN/12345678] at this stage, no further action is taken.

| User Input | Data Set Array Input/Displayed By User | New or Existing Array Resulting from Automatic Inversion |
|---|---|---|
| 5 = | [MFR/GE]<br>‑ [LOCATION/SEATTLE, WA]<br>‑ [MFR-PN/82A-26] | [LOCATION/SEATTLE, WA]<br>‑ [MFR/GE] |
| 6 = |  | [ PHONE/456-1234]<br>‑ [MFR/GE] |
| 7 = | [MFR/WE]<br>‑ [LOCATION/SEATTLE, WA] | [ LOCATION/SEATTLE, WA]<br>‑ [MFR/GE]<br>‑ [MFR/WE] |
| 8 = |  |  |
| 9 = | [MFR/WE]<br>‑ [PHONE/123-4567] | [ PHONE/123-4567]<br>‑ [MFR/WE] |

STATE OF THE DATA SET ARRAY FILE FOLLOWING USER INPUTS 1–9:

[LOCATION/SEATTLE, WA]
‑ [MFR/GE]
‑ [MFR/WE]
[MFR/GE]
‑ [MFR-PN/82A-26]
‑ [PHONE/456-1234]
[MFR/WE]
‑ [LOCATION/SEATTLE, WA]
‑ [PHONE/123-4567]
[MFR-PN/82A-26]
‑ [MFR/GE]
‑ [NSN/12345678]
‑ [COST/24.00]
[PHONE/123-4567]
‑ [MFR/WE]
[PHONE/456-1234]
‑ [MFR/GE]

| User Input | Data Set Array Input/Displayed By User | New or Existing Array Resulting from Automatic Inversion |
|---|---|---|
| 10 = | [MFR/WE]<br>‑ [LOCATION/SEATTLE, WA]<br>‑ [MFR-PN/655ABC]<br>‑ [PHONE/123-4567] | [MFR-PN/655ABC]<br>‑ [MFR/WE] |
| 11 = |  | [SUP/SEATTLE PARTS]<br>‑ [LOCATION/SEATTLE, WA] |
|  | [LOCATION/SEATTLE, WA]<br>‑ [MFR/GE]<br>‑ [MFR/WE]<br>‑ [SUP/SEATTLE PARTS] |  |
| 12 = | [MFR/GE]<br>‑ [LOCATION/SEATTLE, WA]<br>‑ [MFR-PN/82A-26]<br>‑ [PHONE/456-1234] | No Inversion of [COST] in accordance with DCM. |
|  | ‑ ‑ [COST/30.00]<br>‑ [PHONE/456-1234] |  |
| 13 = | [MFR/WE]<br>‑ [LOCATION/SEATTLE, WA]<br>‑ [MFR-PN/655ABC]<br>‑ ‑ [NSN/12345678]<br>‑ ‑ ‑ [COST/24.00]**<br>‑ [PHONE/123-4567] | [NSN/12345678]<br>‑ [COST/24.00]<br>‑ [MFR-PN/655ABC]<br>‑ ‑ [MFR/WE] |

**NOTE: [COST/24.00] was automatically linked to newly input [NSN/12345678] in the [MFR/WE] Array as a result of Global Linking, as specified in the DCM.

| User Input | Data Set Array Input/Displayed By User | New or Existing Array Resulting from Automatic Inversion |
|---|---|---|
| 14 = | [SUP/PORTLAND PARTS]<br>‑ [LOCATION/PORTLAND, OR] | [LOCATION/PORTLAND, OR]<br>‑ [SUP/PORTLAND PARTS] |
| 15 = | [SUP/PORTLAND PARTS]<br>‑ [LOCATION/PORTLAND, OR]<br>‑ [PHONE/789-3456] | [PHONE/789-3456]<br>‑ [SUP/PORTLAND PARTS] |
| 16 = |  |  |

STATE OF THE DATA SET ARRAY FILE FOLLOWING USER INPUTS 1–16:

[LOCATION/PORTLAND, OR]
‑ [SUP/PORTLAND PARTS]
[LOCATION/SEATTLE, WA]
‑ [MFR/GE]
‑ [MFR/WE]
‑ [SUP/SEATTLE PARTS]
[MFR/GE]
‑ [LOCATION/SEATTLE, WA]
‑ [MFR-PN/82A-26]
‑ ‑ [COST/30.00]
‑ [PHONE/456-1234]
[MFR/WE]
‑ [MFR-PN/82A-26]
‑ [MFR/GE]
[NSN/12345678]
‑ [COST/24.00]
‑ [MFR-PN/655ABC]
‑ ‑ [MFR/WE]
[PHONE/123-4567]
‑ [MFR/WE]
[PHONE/456-1234]
‑ [MFR/GE]
[PHONE/789-3456]
‑ [SUP/PORTLAND PARTS]

EXAMPLE II
DISPLAY, INSERT, AND SORT WITH INDENTURING INVERSION, GLOBAL LINK, AND DCM-IMPOSED CONTROLS

| User Input | Data Set Array Input/Displayed By User | New or Existing Array Resulting from Automatic Inversion | STATE OF THE DATA SET ARRAY FILE FOLLOWING USER INPUTS 1-21: |
|---|---|---|---|
| 17 = | [MFR/GE]<br>- [LOCATION/SEATTLE, WA]<br>- [MFR-PN/82A-26] =<br>- - [COST/30.00] =<br>- - [SUP/PORTLAND PARTS]<br>- [PHONE/456.1234] | [SUP/PORTLAND PARTS]<br>- [LOCATION/PORTLAND, OR]<br>- [MFR-PN/82A-26]<br>- - [MFR/GE]<br>- [PHONE/789-3456] | [PHONE/123-4567]<br>- [MFR/WE]<br>[PHONE/456-1234]<br>- [MFR/GE]<br>[PHONE/678-4567]<br>- [SUP/SEATTLE PARTS] |
| 18 = | [MFR/GE]<br>- [LOCATION/SEATTLE, WA]<br>- [MFR-PN/82A-26]<br>- - [COST/30.00]<br>- - [SUP/PORTLAND PARTS]<br>- - - [SUP-PN/26-82A]<br>- [PHONE/456.1234] | [SUP-PN/26-82A]<br>- [SUP/PORTLAND PARTS]<br>- - [MFR-PN/82A-26]<br>- - - [MFR/GE] | [PHONE/789-3456]<br>- [SUP/PORTLAND PARTS]<br>[SUP/PORTLAND PARTS]<br>- [LOCATION/PORTLAND, OR]<br>- [MFR-PN/82A-26]<br>- - [MFR/GE]<br>- [PHONE/789-3456] |
| 19 = | [MFR/GE]<br>- [LOCATION/SEATTLE, WA]<br>- [MFR-PN/82A-26]<br>- - [COST/30.00]<br>- - [SUP/PORTLAND PARTS]<br>- - - [SUP-PN/26-82A]<br>- [SUP/SEATTLE PARTS]<br>- [PHONE/456.1234] | [SUP/SEATTLE PARTS]<br>- [LOCATION/SEATTLE, WA]<br>- [MFR-PN/82A-26]<br>- - [MFR/GE] | [SUP/SEATTLE PARTS]<br>- [LOCATION/SEATTLE, WA]<br>- [MFR-PN/82A-26]<br>- - [MFR/GE]<br>- [PHONE/678-4567]<br>[SUP-PN/26-82A]<br>- [SUP/PORTLAND PARTS]<br>- - [MFR-PN/82A-26]<br>- - - [MFR/GE] |
| 20 = | [MFR/GE]<br>- [LOCATION/SEATTLE, WA]<br>- [MFR-PN/82A-26]<br>- - [COST/30.00]<br>- - [SUP/PORTLAND PARTS]<br>- - - [SUP-PN/26-82A]<br>- - [SUP/SEATTLE PARTS]<br>- - - [SUP-PN/AAA-1]<br>- [PHONE/456.1234] | [SUP-PN/AAA-1]<br>- [SUP/SEATTLE PARTS]<br>- - [MFR-PN/82A-26]<br>- - - [MFR/GE] | [SUP-PN/AAA-1]<br>- [SUP/SEATTLE PARTS]<br>- - [MFR-PN/82A-26]<br>- - - [MFR/GE] |
| 21 = | [SUP/SEATTLE PARTS]<br>- [LOCATION/SEATTLE, WA]<br>- [MFR-PN/82A-26]<br>- - [MFR/GE]<br>- [PHONE/678-4567] | [PHONE/678-4567]<br>- [SUP/SEATTLE PARTS] | |

-continued

[LOCATION/SEATTLE, WA]
- [MFR-PN/655ABC]
- - [NSN/12345678]
- - - [COST/24.00]
- - [PHONE/123-4567]
- [MFR/WE]

[SUP/PORTLAND PARTS]
- [LOCATION/PORTLAND, OR]
- [PHONE/789-3456]
[SUP/SEATTLE PARTS]
- [LOCATION/SEATTLE, WA]

[MFR/GE]
- [LOCATION/SEATTLE, WA]
- [MFR-PN/82A-26]
- - [COST/30.00]
- - [SUP/PORTLAND PARTS]
- - [SUP/SEATTLE PARTS]

- - [SUP-PN/AAA-1]
- [PHONE/456-1234]
[MFR/WE]
- [LOCATION/SEATTLE, WA]
- [MFR-PN/655ABC]
- - [NSN/12345678]
- - - [COST/24.00]
- [PHONE/123-4567]
[MFR-PN/655ABC]
- [MFR/WE]
[MFR-PN/82A-26]
- [MFR/GE]
[NSN/12345678]
- [COST/24.00]
- [MFR-PN/655ABC]
- - [MFR/WE]

-continued

EXAMPLE III
SEARCH, DISPLAY, INSERT, AND SORT WITH INDENTURING INVERSION, AND DCM-IMPOSED CONTROLS

| User Input | Data Set Array Input/Displayed By User | New or Existing Array Resulting from Automatic Inversion | STATE OF THE DATA SET ARRAY FILE FOLLOWING USER INPUTS 1-26: |
|---|---|---|---|
| | [MFR/GE] | [NSN/12345678] | [LOCATION/PORTLAND, OR] |
| | -[LOCATION/SEATTLE, WA] | -[COST/24.00] | -[SUP/PORTLAND PARTS] |
| | -[MFR-PN/82A-26] | --[MFR-PN/655ABC] | [LOCATION/SEATTLE, WA] |
| | --[COST/30.00] | ---[MFR/WE] | -[MFR/GE] |
| 22 = | -[NSN/12345678] | -[MFR-PN/82A-26] | --[MFR/WE] |
| | --[COST/24.00]** | --[MFR/GE] | -[SUP/SEATTLE PARTS] |
| | -[SUP/PORTLAND PARTS] | | [LOCATION/TACOMA, WA] |
| | -[SUP/SEATTLE PARTS] | | -[SUP/AMCO PARTS] |
| | -[SUP-PN/AAA-1] | | [MFR/GE] |
| | -[PHONE/456-1234] | | -[LOCATION/SEATTLE, WA] |
| | | | -[MFR-PN/82A-26] |
| | | | --[COST/30.00] |

**NOTE: [COST/24.00] was automatically linked to newly input [NSN/12345678] in the [MFR/GE] Array as a result of Global Linking, as specified in the DCM.

| | [MFR/WE] | [SUP-PN/A1B23] | -[NSN/12345678] |
|---|---|---|---|
| | -[LOCATION/SEATTLE, WA] | -[SUP/AMCO PARTS] | --[COST/24.00] |
| | -[MFR-PN/655ABC] | --[MFR-PN/655ABC] | -[SUP/PORTLAND PARTS] |
| 23 = | -[NSN/12345678] | ---[MFR/WE] | --[SUP-PN/26-82A] |
| | --[COST/24.00] | | -[SUP/SEATTLE PARTS] |
| | -[SUP/AMCO PARTS] | | --[SUP-PN/AAA-1] |
| | -[PHONE/123-4567] | | -[PHONE/456-1234] |
| | | | [MFR/WE] |
| | [MFR/WE] | [SUP-PN/A1B23] | -[LOCATION/SEATTLE, WA] |
| | -[LOCATION/SEATTLE, WA] | -[SUP/AMCO PARTS] | -[MFR-PN/655ABC] |
| 24 = | -[MFR-PN/655ABC] | --[MFR-PN/655ABC] | -[NSN/12345678] |
| | -[NSN/12345678] | ---[MFR/WE] | --[COST/24.00] |
| | --[COST/24.00] | | -[SUP/AMCO PARTS] |
| | -[SUP/AMCO PARTS] | | --[SUP-PN/A1B23] |
| | -[SUP-PN/A1B23] | | -[PHONE/123-4567] |
| | -[PHONE/123-4567] | | [MFR-PN/655ABC] |
| | [SUP/AMCO PARTS] | [LOCATION/TACOMA, WA] | -[MFR/WE] |
| 25 = | -[LOCATION/TACOMA, WA] | -[SUP/AMCO PARTS] | [MFR-PN/82A-26] |
| | -[MFR-PN/655ABC] | | -[MFR/GE] |
| | -[MFR/WE] | | [NSN/12345678] |
| | [SUP/AMCO PARTS] | [PHONE/345-6789] | -[COST/24.00] |
| | -[LOCATION/TACOMA, WA] | -[SUP/AMCO PARTS] | -[MFR-PN/655ABC] |
| | -[MFR-PN/655ABC] | | --[MFR/WE] |
| 26 = | -[MFR/WE] | | -[MFR-PN/82A-26] |
| | -[PHONE/345-6789] | | --[MFR/GE] |

State of the Data Set Array File (right column continued):

[PHONE/123-4567]
-[MFR/WE]
[PHONE/345-6789]
-[SUP/AMCO PARTS]
[PHONE/456-1234]
-[MFR/GE]
[PHONE/678-4567]
-[SUP/SEATTLE PARTS]
[PHONE/789-3456]
-[SUP/PORTLAND PARTS]
[SUP/AMCO PARTS]
-[LOCATION/TACOMA, WA]
-[MFR-PN/655ABC]
--[MFR/WE]
-[PHONE/345-6789]
[SUP/PORTLAND PARTS]
-[LOCATION/PORTLAND, OR]
-[MFR-PN/82A-26]
--[MFR/GE]
-[PHONE/789-3456]
[SUP/SEATTLE PARTS]
-[LOCATION/SEATTLE, WA]
-[MFR-PN/82A-26]
--[MFR/GE]
-[PHONE/678-4567]
[SUP-PN/26-82A]
-[SUP/PORTLAND PARTS]
-[MFR-PN/82A-26]
---[MFR/GE]
[SUP-PN/A1B23]
-[SUP/AMCO PARTS]
--[MFR-PN/655ABC]
---[MFR/WE]
[SUP-PN/AAA-1]
-[SUP/SEATTLE PARTS]
-[MFR-PN/82A-26]
---[MFR/GE]

-continued

EXAMPLE IV
SEARCH, DISPLAY, INSERT, AND SORT WITH INDENTURING AND DCM-IMPOSED CONTROLS

| User Input | Data Set Array Input/Displayed By User | New or Existing Array Resulting from Automatic Inversion | STATE OF THE DATA SET ARRAY FILE FOLLOWING USER INPUTS 1-30: |
|---|---|---|---|
| 27 = | [MFR/WE]<br>-[LOCATION/SEATTLE, WA]<br>--[MFR-PN/655ABC]<br>--[COST/27.50]<br>--[NSN/12345678]<br>---[COST/24.00]<br>--[SUP/AMCO PARTS]<br>---[SUP-PN/A1B23]<br>-[PHONE/123-4567] | No Inversion of [COST] in accordance with DCM. | [LOCATION/PORTLAND, OR]<br>-[SUP/PORTLAND PARTS]<br>[LOCATION/SEATTLE, WA]<br>-[MFR/WE]<br>-[SUP/SEATTLE PARTS]<br>[LOCATION/TACOMA, WA]<br>-[SUP/AMCO PARTS]<br>[MFR/GE]<br>-[SUP/PORTLAND PARTS]<br>[SUP/AMCO PARTS]<br>-[LOCATION/TACOMA, WA]<br>-[MFR-PN/655ABC]<br>--[MFR/WE]<br>--[PHONE/345-6789]<br>[SUP/PORTLAND PARTS]<br>-[LOCATION/PORTLAND, OR]<br>-[MFR-PN/82A-26]<br>--[MFR/GE]<br>-[PHONE/789-3456]<br>[SUP/SEATTLE PARTS] |
| | [MFR/GE]<br>-[LOCATION/SEATTLE, WA]<br>-[MFR-PN/82A-26]<br>--[COST/30.00]<br>--[NSN/12345678]<br>---[COST/24.00]<br>--[SUP/PORTLAND PARTS]<br>---[SUP-PN/26-82A]<br>--[SUP/SEATTLE PARTS]<br>---[SUP-PN/AAA-1]<br>----[COST/27.35]<br>-[PHONE/456-1234] | No Inversion of [COST] in accordance with DCM. | -[LOCATION/SEATTLE, WA]<br>-[MFR-PN/82A-26]<br>--[MFR/GE]<br>-[PHONE/678-4567]<br>[SUP-PN/26-82A]<br>-[MFR-PN/82A-26]<br>--[MFR/GE]<br>[SUP-PN/A1B23]<br>-[SUP/AMCO PARTS] |
| 28 = | [MFR/WE]<br>-[LOCATION/SEATTLE, WA]<br>-[MFR-PN/655ABC]<br>--[COST/27.50]<br>--[NSN/12345678]<br>---[COST/24.00]<br>--[SUP/AMCO PARTS]<br>---[SUP-PN/A1B23]<br>-[PHONE/123-4567] | No Inversion of [COST] in accordance with DCM. | [MFR-PN/655ABC]<br>-[MFR/WE]<br>[MFR-PN/82A-26]<br>-[MFR/GE]<br>[SUP-PN/AAA-1]<br>-[SUP/SEATTLE PARTS]<br>-[MFR-PN/82A-26]<br>--[MFR/GE] |
| 29 = | | | |
| 30 = | [MFR/GE]<br>-[LOCATION/SEATTLE, WA]<br>-[MFR-PN/82A-26]<br>--[COST/30.00]<br>--[NSN/12345678]<br>---[COST/24.00]<br>--[SUP/PORTLAND PARTS]<br>---[SUP-PN/26-82A]<br>----[COST/42.35]<br>--[SUP/SEATTLE PARTS]<br>---[SUP-PN/AAA-1]<br>----[COST/27.35]<br>-[PHONE/456-1234] | No Inversion of [COST] in accordance with DCM. | |

DATA ACCESS AND DISPLAY—EXAMPLES V-VIII

The following data access and display examples use the Data Set Array File established in the previous example (IV).

EXAMPLE V—DIRECT ACCESS VIA THE KEY DATA SET

User Input: [MFR/GE]
Resulting Display:
[MFR/GE]
- [LOCATION/SEATTLE, WA]
- [MFR PN82A-26]
-- [COST/30.00]
-- [NSN/12345678]
-- [COST/24.00]
-- [SUP/PORTLAND PARTS]
--- [SUP-PN/26-82A]
---- [COST/42.35]
-- [SUP/SEATTLE PARTS]
--- [SUP-PN/AAA-1]
---- [COST/27.35]
- [PHONE/456-1234]

If the user has no specific knowledge of the Data Set Array File contents, he/she is still able to get started by requesting a list of valid Data Types and then selecting one for further display. The resulting display is a list of all Key Data Sets having a Data Type of [MFR]. The user may then select a Key Data Set from the list for further display. Thus, the user is able to access the Data Set Array File without knowing beforehand any of the Key Data Sets it contains.

EXAMPLE VI—ACCESS VIA CONTIGUOUS CONNECTIONS

User Input: [MFR/GE]
Resulting Display:
[MFR/GE]
- [LOCATION/SEATTLE, WA]
- [MFR-PN/82A-26]
-- [COST/30.00]
-- [COST/24.00]
-- [SUP/PORTLAND PARTS]
--- [SUP-PN/26-82A]
---- [COST/42.35]
-- [SUP/SEATTLE PARTS]
--- [SUP-PN/AAA-1]
---- [COST/27.35]
- [PHONE/456-1234]
User Selection for Further Display: -- [NSN/12345678]
Resulting Display:
[NSN/12345678]
- [COST/24.00]
- [MFR-PN/655ABC]
-- [MFR/WE]
- [MFR-PN/82A-26]
-- [MFR/GE]
User Selection for Further Display: -- [MFR/WE]
Resulting Display:
[MFR/WE]
- [LOCATION/SEATTLE, WA]
- [MFR-PN/655ABC]
-- [COST/27.50]
-- [NSN/12345678]
--- [COST/24.00]
-- [SUP/AMCO PARTS]
--- [SUP-PN/A1B23]
---- [COST/28.10]
- [PHONE/123-4567]

This process of selecting a Linked Data Set for further display can go on indefinitely. The inversion process established every user-input Linked Data Set as a Key Data Set (unless the Data Type was [COST], which was not flagged for inversion in this example). This enables the user to trace any path of contiguous connections that exists in the file.

EXAMPLE VII—DISPLAY ACP OF A LINKED DATA SET (DS)

This example illustrates how the logic ACP (FIG. 9) operates when the Data Set selected for ACP (DS(A)) is not the Key Data Set (DS(X)) of the displayed Array.

From the Key Data Set [SUP/PORTLAND PARTS] Array, the user selects the Linked Data Set [MFR/GE] for ACP:
[SUP/PORTLAND PARTS] DS(X)
- [LOCATION/PORTLAND, OR]
- [MFR-PN/82A-26]
-- [MFR/GE] DS(Y)=DS(A) (as shown in the FIG. 9)
- [PHONE/789-3456]

At this point an empty Connection Projection (CP) Array is established with [MFR/GE] (DS(A)=DS(Y)) as its key.

The Higher Level (HL) Subarray for [MFR/GE] (DS(Y)) within the [SUP/PORTLAND PARTS] (Key DS(X)) Array is:
SUP/PORTLAND PARTS]
- [MFR-PN/82A-26]
-- [MFR/GE]
In the [MFR/GE](Key DS(Y)) Array,
MFR/GE]*
- [LOCATION/SEATTLE, WA]
- [MFR-PN/82A-26]*
-- [COST/30.00]
-- [NSN/12345678]
--- [COST/24.00]
-- [SUP/PORTLAND PARTS]*
--- [SUP-PN/26-82A]
---- [COST/42.35]
-- [SUP/SEATTLE PARTS]
--- [SUP-PN/AAA-1]
---- [COST/27.35]
- [PHONE/456-1234]

The asterisks (*) indicate the inverted Higher Level Subarray. The Lower Level (LL) Subarray, defined as all lower level Data Sets linked to the inverted HL Subarray within the Key DS(Y) Array, is:
[SUP-PN/26-82A]
- [COST/42.35]

The resulting Connection Projection (CP) Array, which is displayed to the user, is the inverted HL Subarray with the LL Subarray indentured to it:
[MFR/GE]
- [MFR-PN/82A-26]
-- [COST/30.00] NEW INFORMATION DISPLAYED
-- [NSN/12345678] NEW INFORMATION DISPLAYED
--- [COST/24.00] NEW INFORMATION DISPLAYED
-- [SUP/PORTLAND PARTS]
--- [SUP-PN/26-82A] NEW INFORMATION DISPLAYED

----- [COST/42.35] NEW INFORMATION DISPLAYED

EXAMPLE VIII—DISPLAY ACP OF A KEY DATA SET (DS)

This example illustrates how the logic ACP (FIG. 8) operates when the Data Set selected for ACP DS(A)) is the Key Data Set (DS(X))S of the displayed Array. In ACP of a Key Data Set, the resulting CP Array is built by iteratively projecting the connections for each lowest level Data Set (DS(Y)) linked in the Key Data Set Array.

In this example, the user selects Key Data Set [SUP/AMCO PARTS] for ACP:
SUP/AMCO PARTS] DS(X)=DS(A)
- [LOCATION/TACOMA, WA]
- [MFR-PN/655ABC]
-- [MFR/WE]
- [PHONE/345-6789]

At this point, an empty CP Array is established with [SUP/AMCO PARTS] (DS(A)) as its key.

The next lower Data Set in the Key DS(X) Array is [LOCATION/TACOMA, WA], which has no lower level links in this Array. Thus, [LOCATION/TACOMA, WA] becomes DS(Y). Its Highest Level (HL) Subarray within the Key DS(X) Array is:
[SUP/AMCO PARTS]
- [LOCATION/TACOMA, WA]
In the [LOCATION/TACOMA, WA](Key DS(Y)) Array,
[LOCATION/TACOMA, WA]*
- [SUP/AMCO PARTS]*

The asterisks (*) indicate the inverted HL Subarray. The Key DS(Y) Array contains no additional links relative to the inverted HL Subarrays. The HL Subarray, excluding DS(X), is indentured to the key of the CP Array:
[SUP/AMCO PARTS]
- [LOCATION/TACOMA, WA]

The next lower Data Set in the Key DS(X) Array is [MFR-PN/655ABC]. However, this Data Set has another Data Set indentured below it, namely [MFR/WE], which thus becomes the next DS(Y). Its HL Subarray within the key DS(X) Array is:
[SUP/AMCO PARTS]
- [MFR-PN/655ABC]
-- [MFR/WE]
In the [MFR/WE](Key DS(Y)) Array,
[MFR/WE]*
- [LOCATION/SEATTLE, WA]
- [MFR-PN/655ABC]*
-- [COST/27.50]
-- [NSN/12345678]
--- [COST/24.00]
-- [SUP/AMCO PARTS]*
--- [[SUP-PN/A1B23]
---- [COST/28.10]
- [PHONE/123-4567]

The asterisks (*) indicate the inverted HL Subarray. The Lower Level (LL) Subarray relative to the inverted HL Subarray in the Key DS(Y) Array is:
SUP-PN/A1B23]
- [COST/28.10]

In the CP Array, the LL Subarray is first indentured to the Key Data Set:
[SUP/AMCO PARTS]
- [LOCATION/TACOMA, WA]
- [SUP-PN/A1B23]

--- [COST/28.10]

Then, the HL Subarray, excluding DS(A), is indentured to the highest level Data Set of the LL Subarray within the CP Array:
[SUP/AMCO PARTS]
- [LOCATION/TACOMA, WA]
- [SUP-PN/A1B23]
-- [COST/28.10]
-- [MFR-PN/655ABC]
--- [MFR/WE]

The next lower Data Set in the Key DS(X) Array is [PHONE/345-6789], which has no lower level links in this Array. Thus, [PHONE/345-6789] becomes DS(Y). Its Highest Level (HL) Subarray within the Key DS(X) Array is:
[SUP/AMCO PARTS]
- [PHONE/345-6789]
In the [PHONE/345-6789] (Key DS(Y)) Array,
[PHONE/345-6789]*
- [SUP/AMCO PARTS]*

The asterisks (*) indicate the inverted HL Subarray, The Key DS(Y) Array contains no additional links relative to the inverted HL Subarray, so the HL Subarray, excluding DS(X), is indentured to the key of the CP Array.
[SUP/AMCO PARTS]
- [LOCATION/TACOMA, WA]
- [SUP-PN/A1B23] NEW INFORMATION DISPLAYED
-- [COST/28.10] NEW INFORMATION DISPLAYED
-- [MFR-PN/655ABC]
--- [MFR/WE]
- [PHONE/345-6789]

Since the Key DS(X) Array has no more Linked Data Sets to project, this final CP Array is displayed to the user.

Referring still to the drawing, it was pointed out above that a computer does not have to be employed to manage data in accord with the principles of the present invention and that other systems may instead be employed for that purpose if one wishes.

Figure 11:
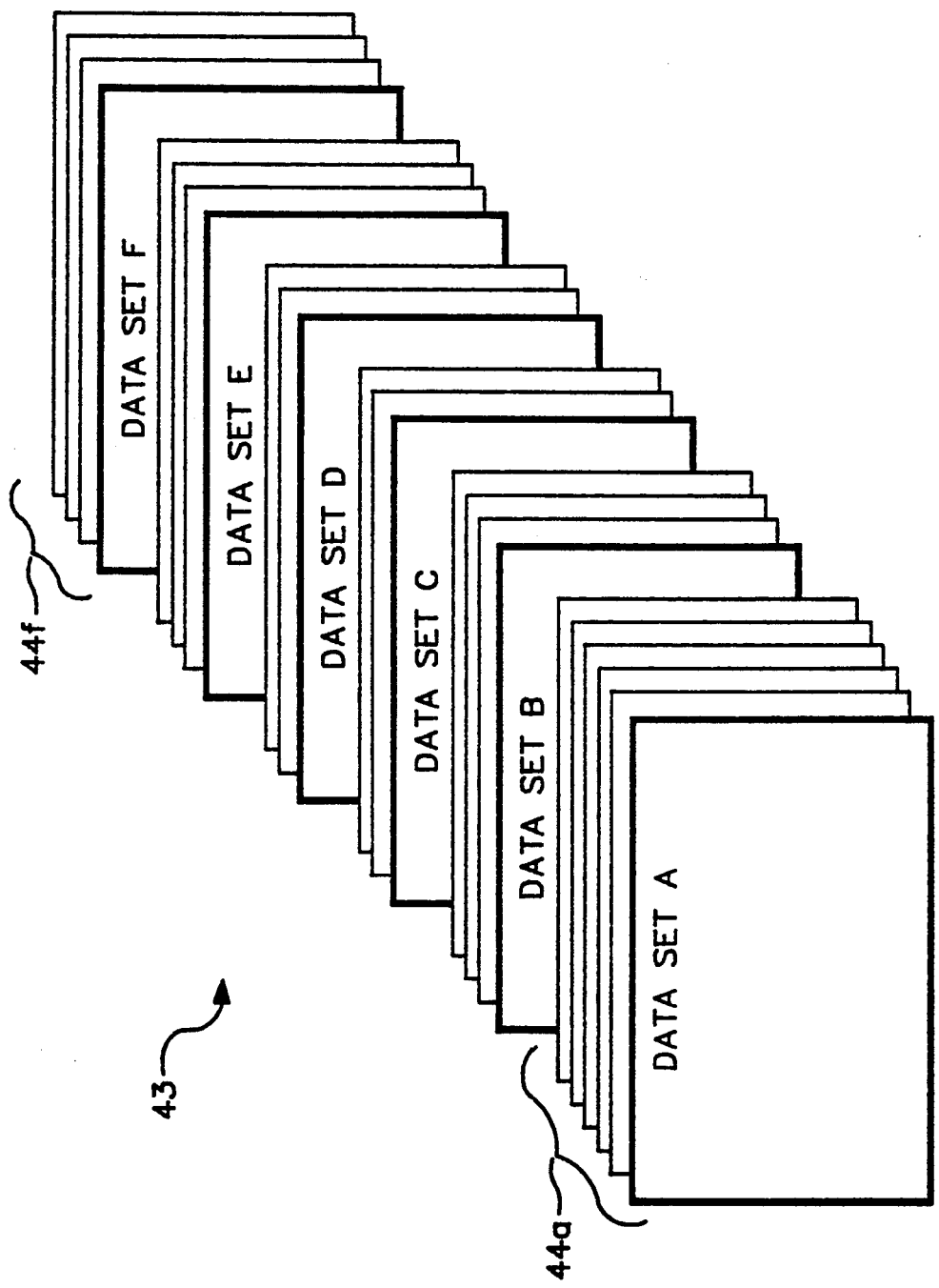
FIG. 11 is a pictorial representation of a card file made up of cards as shown in FIG. 10 and constituting a database constructed in accord with the principles of the present invention.

FIGS. 10 and 11, for example, depict a database in the form of a card file 42. Card file 42 is made up of a set of individual cards each originated and formatted as described above. Thus, each card 44 contains data entered subject to the rules of the data control module in predefined areas of the card and consisting of:
  a key data set (index),
  a summary which consists of the card description or subject and status,
  a structured list of related cards (linked data sets) listed in sorted hierarchical order by their key data sets (indices), and
  detailed supplemental information relative to the key consisting of readable text or graphics or data encoded in the form of bar codes or by other appropriate means.

The entry of key data types and linked (related) data type information in the card file is manually or mechanically checked against allowed types and controls, as specified in a set of rules equivalent to those enforced by the previously discussed data control manager.

For each key data set, inverted file cards created or updated in accordance with the previously described inversion concepts discussed in conjunction with computer-implemented embodiments of the invention. In FIG. 10, an exemplary file card bearing an original data set array is identified by reference character 44a; and one, representative, file card with a data set array derived from that data set by Inversion in accord with the principles of this invention is identified by reference character 44f.

The assemblage 43 of cards 44 making up the data base (FIG. 11) are preferably stored in alphabetical order by key data set and in hierarchical order for Linked Data Sets. This makes it possible to readily retrieve a card with those data sets linked to a particular key data set created by Inversion.

In a card-based system, ACP (automatic connection projection) and the other functions discussed above, like Inversion, are implemented in the same manner that they are in computer-driven implementations of the invention.

The invention may be embodied in forms other than that disclosed above without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of employing a computer with input means, memory, and a data processing unit to manage data, said method comprising the steps of:

employing said computer to create an original array of data sets, each said data set having a data type element for differentiating one kind of subject matter from another and a data value element for differentiating data sets with the same data type element and said array containing a key data set and data sets related to said key data set;

employing said computer to link the related data sets in a hierarchy in which the related data sets are each in an indentured relationship to the key data set;

so employing the computer to invert the relationship between an indentured data set in the original array and the remaining data sets in said array as to create an inverted data set array having: (a) the data set entered in the original array as its key data set, and (b) all data sets higher in the hierarchy of the original data set linked to that key data set in inverted order; and storing the original and inverted data set arrays in the memory of the computer.

2. A method as defined in claim 1 in which the inverting of the relationship between each data set in the original array and the remaining data sets in that array is automatically performed by the computer when the indentured data set is entered into a data set array.

3. A method as defined in claim 1 in which the inverting of the relationships between an indentured data set in the original array and the remaining data sets in that array is performed by the computer upon the indentured data set being selected by a user.

4. A method as defined in claim 1 which includes the step of employing said computer to prevent the inverting of the relationships between data sets with specified data type elements and the remaining data sets in the original data array.

5. A method as defined in claim 1 which includes the step of employing the computer to so establish global links between data sets in an original data set and with two different data types or data value elements that a specific relationship between said data sets will be maintained in the course of inverting or updating data sets to create an inverted array or otherwise manipulating said data sets.

6. A method as defined in claim 1 which includes the step of employing the computer to create contiguous connections between a selected data set in one of said arrays and data sets in at least one other data set array, thereby making a relationship that may not otherwise be apparent.

7. A method as defined in claim 1 in which the computer is employed, in ordering the indentured data sets in a data set array, to insert a hierarchial designator at the start of each indentured data set.

8. A method as defined in claim 7 in which information other than hierarchial position is included in at least one of the hierarchial designators by said computer.

9. A method as defined in claim 1 in which the computer is employed to insert a data set delimiter at the end of each data set in an array.

10. A method as defined in claim 1 in which the computer is employed to order the indentured data sets in each data set array it generates in a hierarchial alphanumeric sequence.

11. A method as defined in claim 1 which includes the step of employing the computer to insert delimiters in an array of data sets to indicate the end of the data type element in each data set.

12. A method as defined in claim 1 which includes the steps of:

employing said input means to select a linked data set from the original or an inverted data set array; and then employing said computer;

to check for a data set array with a key data set equalling the selected data set;

if such a data set array exists, to search the thus identified data set array for an inverted higher level subarray of the selected data set;

if the inverted higher level subarray matches, to search the identified data set array for any lower level linked data sets; and to display a connection projection data set array in which: the key data set is equal to the selected data set, the higher level subarray is indentured to the key data set, and a lower level subarray composed of all lower level linked data sets is indentured to the last data set in the higher level subarray.

13. A method as defined in claim 1 which includes the steps of employing said computer to:

select a linked data set from the original or an inverted data set array; and invert the relationship between the selected linked data set and the remaining data sets in the array in which the selected data set is found and thereby create a further data array having: the selected data set array as its key data set and all data sets higher in the hierarchy of the data set in which the selected data set was located linked to that key data set in inverted order.

14. A method as defined in claim 13 including the steps of repeating at least once the steps of first selecting a linked data set and then creating a further data array as aforesaid.

15. A method as defined in claim 1 which includes the step of adding to at least one of the data sets in the original data set array one or more data elements following the data type element and the data value element.

16. A method as defined in claim 1 which includes the step of providing a non-distorted, collective view of data contained in the original and inverted arrays and having relationships that may be hidden by employing said computer to:
   select a linked key data set from original data set array;
   identify each lowest linked data set in the data set array headed by the selected key data set;
   identify a higher level subarray for each thus identified and lowest linked data set;
   if the lowest linked data set exists elsewhere in said original and inverted data set arrays as a key data set, ascertaining whether the key data set has a lower level subarray;
   if it does, first indenting that subarray to the selected data set and then indenting the higher level subarray of the lowest linked data set to the first data set in said lower level subarray;
   if the lower level subarray does not exist, indenting the higher level subarray under the selected key data set;
   repeating the aforesaid steps for each of the lowest linked data sets; and then
   displaying a contiguous projection data set array thus generated by the computer.

17. A method as defined in claim 1 which includes the steps of:
   employing said input means to select a linked data set from one of said data set arrays and then employing said computer:
   to create a linked data set branch comprised of the selected linked data set and the progressive chain of all directly related data sets linking said selected data set to a root key data set from one of said inverted data set arrays; and then employing said computer:
   to check for a data set array with the key data set equaling the data se at the end of the created linked data set branch and, if such a data set array exists;
   to search the thus identified data set array for the same branch as in the previous inverted data set array and, if the branch matches;
   to then search the identified data set array branch for any data sets related to the key data set of the previous inverted data set array that are not in that inverted data set array and, if new data sets are found;
   to display a connecting projection data set array in which: the key data set is that of the previous inverted data set array and any related data sets found in the previous step are indentured to the last linked data set in the created branch.

18. A method as defined in claim 1 which includes the step of providing a non-distorted collective view of data contained in any data set array having relationships which are not directly shown by:
   employing said input means to select a key data set from one of said data set arrays and then employing said computer:
   to create a set of linked data set branch segments comprised of the selected key data set and the progressive chain of all its directly related linked data sets out to the ends of the branches and subbranches away from a root key data set; and to select each branch segment in the set and identify the linked data set in each branch segment farthest from the root key data set;
   to check for a data set array with the key data set equaling the data set at the end of each selected branch segment and, if such a data set array exists;
   to search the thus identified data set array for the same branch segment as in the previous data set array and, if the branch segment matches, then;
   to search the identified data set array for data sets connected to a branch segment further from the root key data set that are not in said previous data set array branch segment and, if new data sets are found;
   to first indent said new data sets in the order found under the previously selected key data set and then indent said branch segment to the last data set added and, if new data sets are not found;
   to indent said branch segment to the previously selected key data set;
   to repeat the aforesaid steps for each of the branch segments; and then
   to display a connection projection data set array thus generated by the computer.

19. A method as defined in claim 1 in which all of the data making up the original and inverted data set arrays is stored in a single file.

20. A method as defined in claim 19 which includes the step of employing said computer to automatically rearrange the data in said file and thereby maintain an ordered sequence of data each time data is entered in said file.

21. A method as defined in claim 19 which includes the step of employing said computer to avoid duplications of data sets in said file.

22. A method as defined in claim 19 which includes the step of employing said computer to:
   group the original and inverted data set arrays into blocks; and
   so store the data making up said file in the file such that there are spaces between blocks in which additional data can be stored, thereby making it possible to store additional data with little, if any, rearrangement of the data already in the file.

23. A method as defined in claim 19 which includes the step of employing said computer to insert a hierarchial designator at the beginning of each data set in said file and a data set delimiter at the end of each data set.

24. A method as defined in claim 19 in which the computer derives all relationships among data sets in said file without recourse to information outside of said file.

25. A method as defined in claim 24 in which all relationships among data sets in said file are derived by using said indenturing and inversion processes.

26. A method as defined in claim 19 which includes the step of employing said computer to restrict to selected kinds the data types that can be entered in said file.

27. In a method which: (1) utilizes a computer with input means, memory, and a data processing unit to retrieve relevant data from a compilation of data that: (a) is inputted by said input means, (b) is stored in said memory, and (c) includes the relevant data, and (2) requires only said computer for structuring relationships among the items of data, the steps of:
   employing the computer to resolve the compilation of data into multiple arrays of data sets, each said data set having a data type element for differentiating one type of subject matter from another and a data value element for differentiating data sets with the same data type element from each other and each said data set array containing a key data set and data sets related to said key data set; and employing said computer to so link the data sets in the data arrays as to make evident relationships among the data sets which exist but are not directly connected.

28. A method as defined in claim 27 in which the computer is employed to indenture and maintain the related data sets to the key data set in a sequential, hierarchial order.

29. A method as defined in claim 28 in which, in ordering the indentured data sets in a data set array, the computer is employed to insert a hierarchial designator at the start of each indentured data set.

30. A method as defined in claim 29 in which information other than hierarchical position is included in at least one of the hierarchial designators by said computer.

31. A method as defined in claim 28 in which the linked data sets are stored in memory in hierarchial alphanumeric order.

32. A method as defined in claim 27 in which the computer is employed to insert a data set delimiter at the end of each data set in an array.

33. A method as defined in claim 27 which includes the step of employing the computer to insert delimiters in said arrays to indicate the end of the data type in each data set.

34. A method as defined in claim 27 in which all of the data making up said data set arrays is stored in an ordered, sequential manner in a single file.

35. A method as defined in claim 34 which includes the step of employing said computer to automatically rearrange the data in said file and thereby maintain the ordered sequence of data each time data is entered in said file.

36. A method as defined in claim 34 in which the computer is employed to derive all relationships among the data sets in said file without recourse to information outside of said file.

37. A method as defined in claim 34 which includes the step of employing said computer to limit the kinds of data types that can be entered in said file, and to check data value formats.

38. A method of managing data which includes the steps of:
generating a multiplicity of data sets, each of which contains a data type element for differentiating one type of subject matter from another and a data value element which differentiates data sets with the same data type element from each other:
grouping said data sets into one or more original hierarchial arrays, each having a key data set and linked data sets indentured to the key data set; and
so inverting relationships between an indentured data set and the other data sets in the same data set array as to create a new, inverted array of data sets in which the indentured data set is the key data set and all higher level data sets in the original array are indentured to the key data set of the new, inverted array.

39. A method as defined in claim 38 in which the inverting of the relationships between the indentured data set and the other data sets in the same data set array is automatically performed when the selected indentured data set is entered into a data set array.

40. A method as defined in claim 38 in which the inverting of the relationships between the indentured data set and the other data sets in the same data set array is performed upon the indentured data set being entered by a user.

41. A method as defined in claim 38 which includes the step of employing said computer to prevent the inverting of the relationships between data sets having specified data type elements.

42. A method as defined in claim 38 which includes the step of so establishing global links between data sets that relationships existing between said data sets will be maintained in the course of inverting data sets to create a new array or in otherwise manipulating said data sets.

43. A method as defined in claim 38 which includes the step of creating contiguous connections between a selected data set in one data set array and data sets in at leas one other data set array, thereby making visible relationships that may not otherwise be apparent.

44. A method as defined in claim 38 in which, in ordering the indentured data sets in a data set array, a hierarchial designator is inserted at the start of each indentured data set.

45. A method as defined in claim 44 in which information other than hierarchial position is included in at least one of the hierarchial designators.

46. A method as defined in claim 38 which includes the step of inserting delimiters in said arrays to indicate the end of the data type in each data set.

47. A method as defined in claim 38 in which the indentured data sets in a data set array are ordered in a hierarchial alphanumeric sequence.

48. A method as defined in claim 38 in which a data set delimiter is inserted at the end of each data set in an array.

49. A method as defined in claim 38 in which the linked data sets are stored in memory in hierarchial alphanumeric order.

50. A method as defined in claim 38 which includes the steps of:
selecting a linked data set from one of said data set arrays; and then
checking for a data set array with a key data equalling the selected data set;
if such a data set array exists, searching the thus identified data set array for an inverted higher level subarray of the selected data set;
if the inverted higher level subarray matches, searching the identified data set array for any lower level linked data sets; and
displaying a connection projection data set array in which: the key data set is equal to the selected data set, the higher level subarray is indentured to the key data set, and a lower level subarray composed of all lower level linked data sets is indentured to the last data set in the higher level subarray.

51. A method as defined in claim 38 which includes the steps of:
selecting a linked data set from one of the data set arrays, and
so inverting the relationships between the selected linked data set and the remaining data sets in the array in which the selected data set is found and as to create a further data array having: the selected data set array as its key data set and all data sets higher in the hierarchy of the data set in which the selected data set was found linked to that key data set in inverted order.

52. A method as defined in claim 51 which includes the steps of repeating at least once the steps of first entering a linked data set and then creating a further data array as aforesaid.

53. A method as defined in claim 38 which includes the steps of establishing between two of the data sets a relationship which remains constant irrespective of the subsequent manipulation of one or both of said data sets.

54. A method as defined in claim 38 in which at least one of said data sets has one or more data elements following the data type element and the data value element.

55. A method as defined in claim 38 which includes the step of providing a non-distorted, collective view of data contained in said arrays and having relationships that may otherwise by invisible by:
  selecting a data set from the arrays;
  identifying each lower linked data set in the data set array headed by the selected data set;
  identifying a higher level subarray for each thus identified lowest linked data set;
  if the selected data set exists elsewhere in the said arrays as a key data set, ascertaining whether the key data set has a lower level subarray;
  if it does, first indenting that subarray to the key data set and then indenting the higher level subarray of the lowest linked data set to the first data set in said lower level subarray;
  if the lower level subarray does not exist, indenting the higher level subarray under the selected data set;
  repeating the aforesaid steps for each of the lowest linked data sets; and
  then displaying the thus generated contiguous projection data set array.

56. A method as defined in claim 40 in which all of the data making up said data set arrays is stored in a ordered, sequential manner in a single file.

57. A method as defined in claim 56 which includes the step of automatically rearranging the data in said file each time data is entered in said file and thereby maintaining the ordered sequence of data.

58. A method as defined in claim 56 which includes the steps of:
  grouping the data set arrays into blocks, and
  so storing the data making up said file in the file that there are spaces between said blocks in which additional data can be stored, thereby making it possible to store said additional data with little, if any, rearrangement of the data already in the file.

59. A method as defined in claim 40 which includes the step of restricting to selected the data types that can be entered in said arrays.

60. In a method of retrieving relevant data from a compilation of data elements without the use of a separate means for structuring relationships among the data elements, the steps of:
  resolving the compilation of data elements into one or more arrays of data sets, each having a data type element for differentiating one type of subject matter from another and a data value element for differentiating data-sets with the same data type element from each other and each said data set array containing a key data set and data sets related to said key data set; and
  so linking the data sets in the data arrays as to make visible relationships among the data sets which exist but are not defined.

61. A method as defined in claim 60 in which the related data sets are indentured under a key data set in a sequential, hierarchial order.

62. A method as defined in claim 60 in which, in ordering the indentured data sets in a data set array, a hierarchial designator is inserted at the start of each indentured data set.

63. A method as defined in claim 62 in which information other than hierarchial position is included in at least one of the hierarchial designators.

64. A method as defined in claim 60 in which the linked data sets are stored in hierarchial alphanumeric order.

65. A method as defined in claim 60 in which a data set delimiter is inserted at the end of each data set in an array.

66. A method as defined in claim 60 in which delimiters are inserted to indicate the end of the data type in each data set.

67. A method as defined in claim 60 in which all of the data making up said data set arrays is stored in an ordered, sequential manner in a single file.

68. A method as defined in claim 67 which includes the steps of automatically rearranging the data in said file and thereby maintaining the ordered sequence of data each time data is entered in said file.

69. A method as defined in claim 67 which includes the step of keeping duplicate data sets from said file.

70. A method as defined in claim 67 in which all relationships among data sets in said file are derived without recourse to information outside of the file.

71. A method as defined in claim 67 which includes the steps of limiting the kinds of data that can be entered in said file.

72. A data management computer system which comprises:
  means for creating data sets, each having a data type element for differentiating one type of subject matter from another and a data value element for differentiating data sets with the same data type element from each other;
  means for organizing said data sets into one or more data arrays, each of said data set arrays having a key data set and one or more linked data sets indentured to the key data set in a sequential hierarchial relationship; and
  memory means in which the thus generated and organized data sets can be stored.

73. A system as defined in claim 72 in which the computer has means for inverting relationships between a selected data set and the other data sets in the data set array in which the selected data set is entered, thereby creating a new, inverted array of data sets in which the selected data set is the key data set and all other higher level sets in the original array are indentured to the key data set of the new, inverted array.

74. A system as defined in claim 72 which has a data control module for inhibiting the inversion of those data sets input by a user.

75. A system as defined in claim 72 which has means for so establishing user-designatable global links between selected data sets that will be maintained throughout the course of creating an inverted array and/or other manipulations of the data sets.

76. A system as defined in claim 72 which has means for automatically establishing contiguous connections between data sets in different arrays and thereby making visible relationships among data sets that may not otherwise be apparent.

77. A system as defined in claim 72 which has means for arranging the data sets in each array in hierarchial order.

78. A system as defined in claim 72 which has means which is used to designate the hierarchial position and delimit the end of each data set and the end of the data type element in each data set.

79. A system as defined in claim 78 which has means that can be employed to add other information to the designator of a data set hierarchial position.

80. A system as defined in claim 72 which has means for creating a single file and for storing all data arrays generated by the system in that file.

81. A system as defined in claim 80 which has means for automatically rearranging the data in said file each time new data is entered in that file and thereby maintaining the data in the file in a specified order.

82. A system as defined in claim 72 which has a data control module selectively employable to limit the kinds of data which can be entered into the system for processing.

83. A system as defined in claim 72 which has means for repairing a data base with partially corrupted data.

84. A method for employing a computer with input means, random access memory, and a data processing unit to manage data, said method comprising the steps of:

employing said computer to create and manipulate a plurality of original data set arrays comprised of a key data set and zero or more related data sets linked to the key data set, each said key and related data set having a variable length data type element for differentiating one kind of subject matter from another and a variable length data value element for differentiating data sets with the same data type element, each data type being delimited with a unique character or binary number at its end to separate it from the data value element and each key and related data set being delimited by a unique character or binary number at the end thereof to separate said data set from other data sets;

employing said computer, without the use of memory pointers, to contiguously link selected related data sets in memory to a key data set or to existing related data sets in a data set array in a hierarchical tree arrangement with an indenturing process which uses hierarchy designators to establish a hierarchy of related data sets indentured to the key data set, the key data set acting as a root of said hierarchy and the related data sets being linked as multiple level branches to said root;

so employing the computer to create one or more new inverted data set arrays with the same structure as the original data set array, using an inversion process by which: (a) each selected indentured data set from the original data set array is used to create a new key data set, and (b) all data sets in said original data set array which are data set hierarchy branches containing the indentured data set which re nearer said root are indentured to the new key data set in inverted order using said indenturing process; and storing the original and inverted data set arrays in the memory of the computer.

85. A method as defined in claim 84 which comprises the steps of employing the computer to exclude data sets from the creation, indenturing, and inversion processes based upon data element type and data element value rules established by the user and store in memory.

86. A method as defined in claim 84 which includes the step of employing said computer to automatically rearrange the data in said file and maintain the sequence of data sets in the data set arrays in the order in which they are arrayed by using said indenturing and inversion processes.

87. A method as defined in claim 84 which includes the step of employing said computer to avoid duplications of data sets in said data set arrays when a data set is directed by an operator and entered in said file by, each time a data set is so entered:

matching the data to be entered with existing data in the data set array; and if there is no match, placing the data set in a data set array comprised of a key data set and one or more related data sets linked as aforesaid.

* * * * *